(12) United States Patent
Shibata et al.

(10) Patent No.: US 8,238,423 B2
(45) Date of Patent: Aug. 7, 2012

(54) IMAGE PROCESSING APPARATUS AND METHOD

(75) Inventors: Shojiro Shibata, Kanagawa (JP); Takeshi Shibata, Tokyo (JP); Kyohei Koyabu, Kanagawa (JP); Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 12/530,643

(22) PCT Filed: Sep. 12, 2008

(86) PCT No.: PCT/JP2008/066910
§ 371 (c)(1),
(2), (4) Date: Sep. 10, 2009

(87) PCT Pub. No.: WO2009/035143
PCT Pub. Date: Mar. 19, 2009

(65) Prior Publication Data
US 2010/0135386 A1    Jun. 3, 2010

(30) Foreign Application Priority Data

Sep. 12, 2007 (JP) .................. 2007-236944
Jun. 27, 2008 (JP) .................. 2008-169396

(51) Int. Cl.
*H04N 7/12* (2006.01)

(52) U.S. Cl. .............. 375/240.03; 375/240.12

(58) Field of Classification Search .......... None
See application file for complete search history.

(56) References Cited

U.S. PATENT DOCUMENTS

| | | | |
|---|---|---|---|
| 5,604,494 A | 2/1997 | Murakami et al. | |
| 5,703,646 A | 12/1997 | Oda | |
| 5,721,589 A | 2/1998 | Murata | |
| 5,870,145 A | 2/1999 | Yada et al. | |
| 5,933,532 A | 8/1999 | Mihara | |
| 6,011,589 A * | 1/2000 | Matsuura et al. | 375/240.14 |
| 6,100,931 A | 8/2000 | Mihara | |
| 6,163,573 A | 12/2000 | Mihara | |
| 6,337,879 B1 | 1/2002 | Mihara et al. | |

(Continued)

FOREIGN PATENT DOCUMENTS

CN     1656818     8/2005

(Continued)

*Primary Examiner* — Phirin Sam
(74) *Attorney, Agent, or Firm* — Frommer Lawrence & Haug LLP; William S. Frommer

(57) ABSTRACT

To predict a target code amount from a code amount calculated on a single quantizer scale. The present invention stores relationship information on a plurality of pieces of quantized data for prediction having different MB generated code amounts on a fixed quantizer scale (QI) as prediction curves, the relationship information indicating a relationship between a plurality of quantizer scales (Q) representing a plurality of quantizer steps and MB generated code amounts. The present invention quantizes image data on a macroblock-by-macroblock basis on the single fixed quantizer scale (QI) out of the predetermined plurality of quantizer scales (Q), thereby generating temporary quantized data, and calculates the MB generated code amount of each macroblock unit of this temporary quantized data. The present invention then selects a piece of quantized data for prediction from the plurality of prediction curves based on the MB generated code amount of the temporary quantized data and the fixed quantizer scale (QI), and predicts the MB generated code amounts for situations when the image data is quantized on quantizer scales (Q) not selected by a quantization selection section, based on the selected piece of quantized data for prediction.

20 Claims, 19 Drawing Sheets

U.S. PATENT DOCUMENTS

| | | |
|---|---|---|
| 6,678,322 B1 | 1/2004 | Mihara |
| 6,907,069 B2 * | 6/2005 | Matsuzaki et al. ....... 375/240.12 |
| 6,934,330 B2 | 8/2005 | Sugiyama et al. |
| 7,286,715 B2 | 10/2007 | Togashi et al. |
| 7,751,476 B2 * | 7/2010 | Tanizawa et al. ........ 375/240.03 |
| 2003/0223495 A1 | 12/2003 | Sun et al. |
| 2003/0223496 A1 | 12/2003 | Sun et al. |
| 2003/0223645 A1 | 12/2003 | Sun et al. |
| 2003/0231796 A1 * | 12/2003 | Caviedes ....................... 382/239 |
| 2005/0175094 A1 * | 8/2005 | Kitamura et al. ........ 375/240.03 |
| 2006/0215763 A1 | 9/2006 | Morimoto et al. |

FOREIGN PATENT DOCUMENTS

| | | |
|---|---|---|
| DE | 603 13 454 T2 | 1/2008 |
| DE | 60313454 D | 1/2008 |
| DE | 60313454 T2 | 1/2008 |
| EP | 1510078 | 3/2005 |
| EP | 1553782 | 7/2005 |
| EP | 1705920 | 9/2006 |
| EP | 1 746 843 | 1/2007 |
| JP | 4-114585 | 4/1992 |
| JP | 8-65677 | 3/1996 |
| JP | 09-294263 | 11/1997 |
| JP | 10-174098 | 6/1998 |
| JP | 2000-224587 | 8/2000 |
| JP | 3264043 | 12/2001 |
| JP | 2002 290914 | 10/2002 |
| JP | 3358620 | 10/2002 |
| JP | 2002-359853 | 12/2002 |
| JP | 3561962 | 6/2004 |
| JP | 2005-192232 | 7/2005 |
| JP | 2006-148419 | 6/2006 |
| JP | 2006-222555 | 8/2006 |
| JP | 2006-270437 | 10/2006 |
| JP | 2007-067469 | 3/2007 |
| JP | 4135427 | 6/2008 |
| KR | 10-2006-0115404 | 11/2006 |
| KR | 10-2007-0051807 | 5/2007 |
| TW | 241532 | 10/2005 |
| WO | WO 98/26602 | 6/1998 |
| WO | WO 03/101117 A1 | 12/2003 |
| WO | WO 03/101117 B | 12/2003 |

* cited by examiner

IMAGE PROCESSING APPARATUS AND METHOD

TECHNICAL FIELD

The present invention relates to an image processing apparatus and method, and more particularly to the technical field of predicting a target code amount accurately from a generated code amount that is calculated on a fixed quantizer scale.

BACKGROUND ART

Conventionally, in MPEG-2 (Moving Picture Experts Group 2) and other image coding schemes, ideal allocation of code amounts has been a significant challenge for maintaining subjective image quality.

For example, code amount allocation ideal for a still image refers to the state that the still image is encoded with uniform distortion (fixed quantizer scale). With highly-distorted code amounts, distortions can be gathered into high frequency components or complicated areas for improved subjective image quality.

For example, Patent Document 1 discloses a method of coding an image quality signal, in which code amount control of so-called feedforward system is employed to enable controls adaptive to local properties of the image quality signal, thereby allowing a decoded image of improved image quality. In the feedforward system, the amounts of code to be generated from an equal length unit are calculated in advance for quantizer steps based on a plurality of quantizer scales, and an appropriate quantizer scale is determined beforehand within the extent that the generated code amount will not exceed a target code amount.

Meanwhile, in proposed MPEG-2 test model TM5 and the like, code amount control is effected by means of feedback control using the relationship between the remaining level of a virtual buffer, quantizer steps used in previous encoding, and generated code amounts.
Patent Document 1: International Publication WO96/28937.

According to the foregoing still-image based conventional art, however, it is necessary to calculate code amounts and make predictions with different quantizer steps plural times in order to find out an average quantizer step that is close to the target code amount and provides uniformity across the entire screen. This increases the cost pertaining to the circuits for calculation.

DISCLOSURE OF THE INVENTION

It is therefore a purpose of the present invention to predict generated code amounts at quantizer steps other than a fixed quantizer step from the generated code amount calculated with the fixed quantizer step, thereby facilitating the processing of predicting the generated code amounts and consequently reducing the circuits for calculation.

There are provided: a temporary coding section for quantizing image data with a quantizer step selected by a quantization selection section to generate temporary quantized data, and calculating a quantization unit generated code amount, the quantization unit generated code amount being a generated code amount of each quantization unit of the temporary quantized data; a storing section for storing relationship information on a plurality of pieces of quantized data for prediction having different quantization unit generated code amounts at the quantizer step selected by the quantization selection section, the relationship information indicating a relationship between the plurality of quantizer steps and the quantization unit generated code amounts; a data selection section for selecting quantized data for prediction from the relationship information based on the quantization unit generated code amount of the temporary quantized data and the quantizer step selected by the quantization selection section; and a code amount prediction section for predicting the quantization unit generated code amounts for situations where the image data is quantized with quantizer steps not selected by the quantization selection section out of the plurality of quantizer steps, based on the quantized data for prediction selected by the data selection section.

This makes it possible to predict the generated code amounts at the quantizer steps not selected by the quantization selection section from the generated code amount calculated with the quantizer step selected by the quantization selection section.

There are provided: a quantization selection step of selecting a quantizer step for each quantization unit from among a plurality of quantizer steps; a temporary coding step of quantizing image data with the quantizer step selected by the quantization selection step to generate temporary quantized data, and calculating a quantization unit generated code amount, the quantization unit generated code amount being a generated code amount of each quantization unit of the temporary quantized data; a storing step of storing relationship information on a plurality of pieces of quantized data for prediction having different quantization unit generated code amounts at the quantizer step selected by the quantization selection step, the relationship information indicating a relationship between the plurality of quantizer steps and the quantization unit generated code amounts; a data selection step of selecting quantized data for prediction from the relationship information based on the quantization unit generated code amount of the temporary quantized data and the quantizer step selected by the quantization selection step; and a code amount prediction step of predicting the quantization unit generated code amounts for situations where the image data is quantized with quantizer steps not selected by the quantization selection section out of the plurality of quantizer steps, based on the quantized data for prediction selected by the quantization selection step.

This makes it possible to predict the generated code amounts at the quantizer steps not selected by the quantization selection section from the generated code amount calculated with the quantizer step selected by the quantization selection section.

According to the present invention, it is therefore possible to provide an image processing apparatus and an image processing method that can predict generated code amounts at quantizer steps not selected by the quantization selection section from a generated code amount calculated with a quantizer step selected by the quantization selection section, and can predict generated code amounts at different quantizer steps by simple processing.

BEST MODE FOR CARRYING OUT THE INVENTION

Now, best modes for carrying out the present invention (hereinafter, referred to simply as embodiments) will be described in detail with reference to the drawings. The description will be given in the following order:

(1) First embodiment (prediction of generated code amounts based on a fixed quantizer scale (MPEG-2));

(2) Second embodiment (feedback control using the generated code amounts predicted (MPEG-2));

(3) Third embodiment (slice-by-slice feedback control (MPEG-2); and (4) Fourth embodiment (prediction of generated code amounts based on a fixed quantizer scale (AVC)).

The first embodiment of the present invention deals with a coding method that uses a fixed Huffman table, typified by MPEG (Moving Picture Experts Group)-2 and the like, in which the following characteristic processing is performed.

First, temporary coding is performed with a fixed quantizer step based on a fixed quantizer scale QI. MB generated code amounts at quantizer steps based on all quantizer scales are predicted from the MB generated code amounts of the respective macroblocks, and are added up for an entire picture to predict a picture generated code amount on a picture-by-picture basis. Second, predetermined grouping is performed with respect to each of macroblock modes which indicate the states of the macroblocks. MB generated code amounts are estimated based on transition curves, which are relationship information determined statistically or by approximate formulas for each range of the MB generated code amount. Third, activity (for example, TM5 Step 3) processing to quantize complicated image areas more strongly is performed by offsetting the quantizer scale Q in each range of the MB generated code amount.

The second embodiment of the present invention is characterized in that, encoding is performed with a fixed quantizer scale QI in advance, and the MB generated code amounts of respective macroblocks are utilized to predict the average quantizer scale Qa of the picture and to predict the target code amounts of the macroblocks, whereby rate control is performed so that quantizer scales Q have a favorable distribution within the picture.

In the third embodiment of the present invention, the rate control (feedback control) which has been performed in units of macroblocks in the second embodiment is performed in units of slices.

The fourth embodiment of the present invention is to perform temporary coding with a fixed quantizer step based on a fixed quantization parameter QPI in AVC. In the third embodiment, MB generated code amounts predicted based on relationship information are corrected. From the MB generated code amounts, MB generated code amounts at quantizer steps based on all the quantizer scales are predicted.

Hereinafter, each of the embodiments will be described in detail.

(1) First Embodiment (1-1) Configuration of Coding Apparatus

Figure 1:
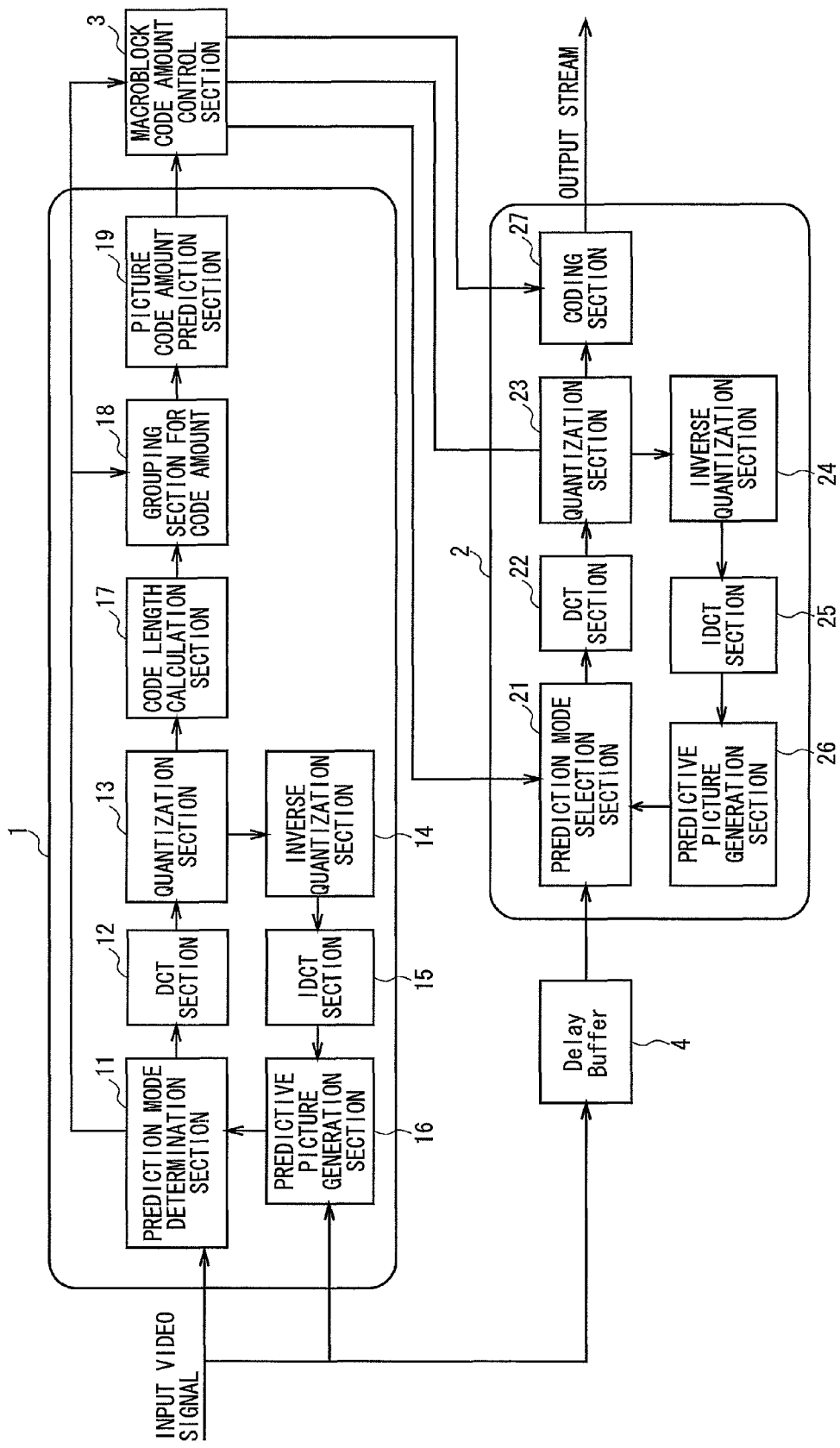
FIG. 1 is a block diagram of a coding apparatus according to a first embodiment of the present invention.

FIG. 1 shows the configuration of a coding apparatus according to the first embodiment of the present invention, which will now be described.

As shown in this FIG. 1, the coding apparatus supports MPEG-2, and includes a precoder 1, a parameter encoder 2, a macroblock code amount control section 3, and a delay buffer 4. The precoder 1 includes a prediction mode determination section 11, a DCT (Discrete Cosine Transform) section 12, a quantization section 13, an inverse quantization section 14, an IDCT (Inverse Discrete Cosine Transform) section 15, a motion estimation and predictive picture generation section 16, a code length calculation section 17, a grouping section 18 for code amount, and a picture code amount prediction section 19. The parameter encoder 2 includes a predictive picture selection section 21, a DCT section 22, a quantization section 23, an inverse quantization section 24, an IDCT section 25, a predictive picture generation section 26, and a coding section 27.

With such configuration, the precoder 1 performs pre encoding, and the parameter encoder 2 performs actual encoding. It should be appreciated that the precoder 1 corresponds to the temporary coding section, for example. The parameter encoder 2 corresponds to the actual coding section, for example. The macroblock code amount control section 3 corresponds to the code amount control section, for example.

Figure 2:
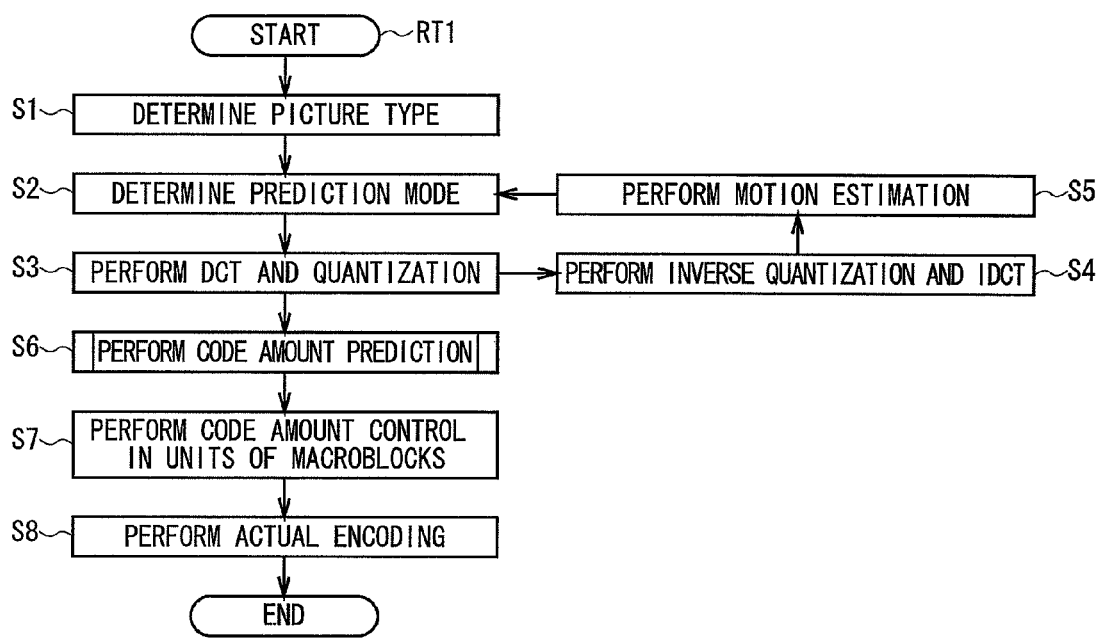
FIG. 2 is a flowchart detailing coding processing of the coding apparatus according to the first embodiment of the present invention.

Referring to the flowcharts of FIGS. 2 and 3, detailed description will hereinafter be given of coding processing of the coding apparatus which is an image processing apparatus according to the first embodiment of the present invention. It should be noted that all or part of the following processing also corresponds to an image coding method which is an image processing method according to the first embodiment of the present invention.

In the prediction mode determination section 11, picture types are periodically assigned to an input video signal, like IBBPBBP..., based on N which determines the GOP (Group Of Pictures) period and an initial value M which determines the period of an I- or P-picture (step S1). Next, in the prediction mode determination section 11, the input video signal is received, and a macroblock type or a prediction mode is determined from among Intra MB (MB_Intra), forward predictive MB (MB_FW), backward predictive MB (MB_BW), bidirectional M (MB_BI), etc., based on the residual (MAD) from an MC picture determined by the predictive picture generation section 16, a macroblock distribution, and so on. A predictive picture is transmitted to the DCT section 12 (step S2).

In the DCT section 12, the predictive picture is transformed into a frequency domain by a discrete cosine transform, and DCT coefficient data is transmitted to the quantization section 13. This quantization section 13 performs quantization processing using a quantizer step based on a fixed quantizer scale QI (for example, q_scale=10) that is fixed to the DCT coefficient data (step S3). This quantizer scale Q is determined by a quantization index.

In the inverse quantization section 14 and the IDCT section 15, a local decoded picture is generated in order to obtain a predictive picture based on the output of the quantization section 13. That is, in the inverse quantization section 14, the quantized data supplied from the quantization section 13 is inversely quantized to reproduce the DCT coefficient data. In the IDCT section 15, this DCT coefficient data is subjected to an inverse discrete cosine transform to generate a local decoded picture. Based on this local decoded picture, the predictive picture generation section 16 then performs a motion estimation (steps S4 and S5).

Next, code amount prediction is performed (step S6). More specifically, as shown in the flowchart of FIG. 3, the output (quantized data) of the quantization section 13 is also transmitted to the code length calculation section 17, in which the MB generated code amount is computed for each macroblock based on the code lengths of the Huffman table that is actually used for coding (step S11). In the grouping section 18 for code amount, the code amounts are classified into some 16 to 32 groups based on macroblock type classifications determined in the prediction mode determination section 11, upper bits of the MB generated code amounts, and so on (step S12). This grouped data (in 16 groups in this example) is transmitted to the picture code amount prediction section 19. In the picture code amount prediction section 19, the MB generated code amounts are added up based on statistically-determined curves (the relationship between the quantizer scale Q and the MB generated code amount to be described later in FIG. 4), whereby a picture generated code amount per picture is determined (step S13). Subsequently, an average quantizer scale Qa for the picture to be based on is determined (step S14). Based on this average quantizer scale Qa, the target code amounts Target$_{MB}$ of the respective macroblocks and basic quantizer scales Q$_{MB}$ in units of macroblocks are determined (step S15) to end the processing of FIG. 3.

Incidentally, if activities are to be taken into account, a predetermined offset is defined for each of the transition curves of FIG. 4 to be described later (i.e., for each group) when determining the target code amounts Target$_{MB}$ for each picture.

Returning to the description of FIG. 1, in the macroblock code amount control section 3, as described above, the quantizer scale Q of the picture is converted into and set as basic quantizer scales Q$_{MB}$ and target code amounts Target$_{MB}$ of respective macroblocks based on the information grouped by the grouping section 18 for code amount and the statistically-determined transition curves.

In the parameter encoder 2, actual MB generated code amounts are fed back (step S7) while code amount control is performed based on the picture type determined by the precoder 1, macroblock prediction modes, motion vectors, and the basic quantizer scales Q$_{MB}$ and the target code amounts Target$_{MB}$ determined by the picture code amount prediction section 19, and parameter encoding is performed (step S8).

More specifically, the input video signal is input through delay processing by the delay buffer 4. In the prediction mode selection section 21, a macroblock prediction mode is instructed from the macroblock code amount control section 3, and a prediction mode is selected accordingly. In the DCT section 22, a discrete cosine transform is performed and DCT coefficient data is transmitted to the quantization section 23. In the quantization section 23, quantization is performed on this DCT coefficient data with quantizer steps based on the basic quantizer scales Q$_{MB}$ determined by the macroblock code amount control section 3, and quantized data is transmitted to the coding section 27. In this coding section 27, variable length coding is performed, whereby a coded stream is output. In the inverse quantization section 24, the IDCT section 25, and the predictive picture generation section 26, a local decoded picture is generated in order to obtain a predictive picture based on the output (quantized data) of the quantization section 23. This completes the series of processing.

Figure 4:
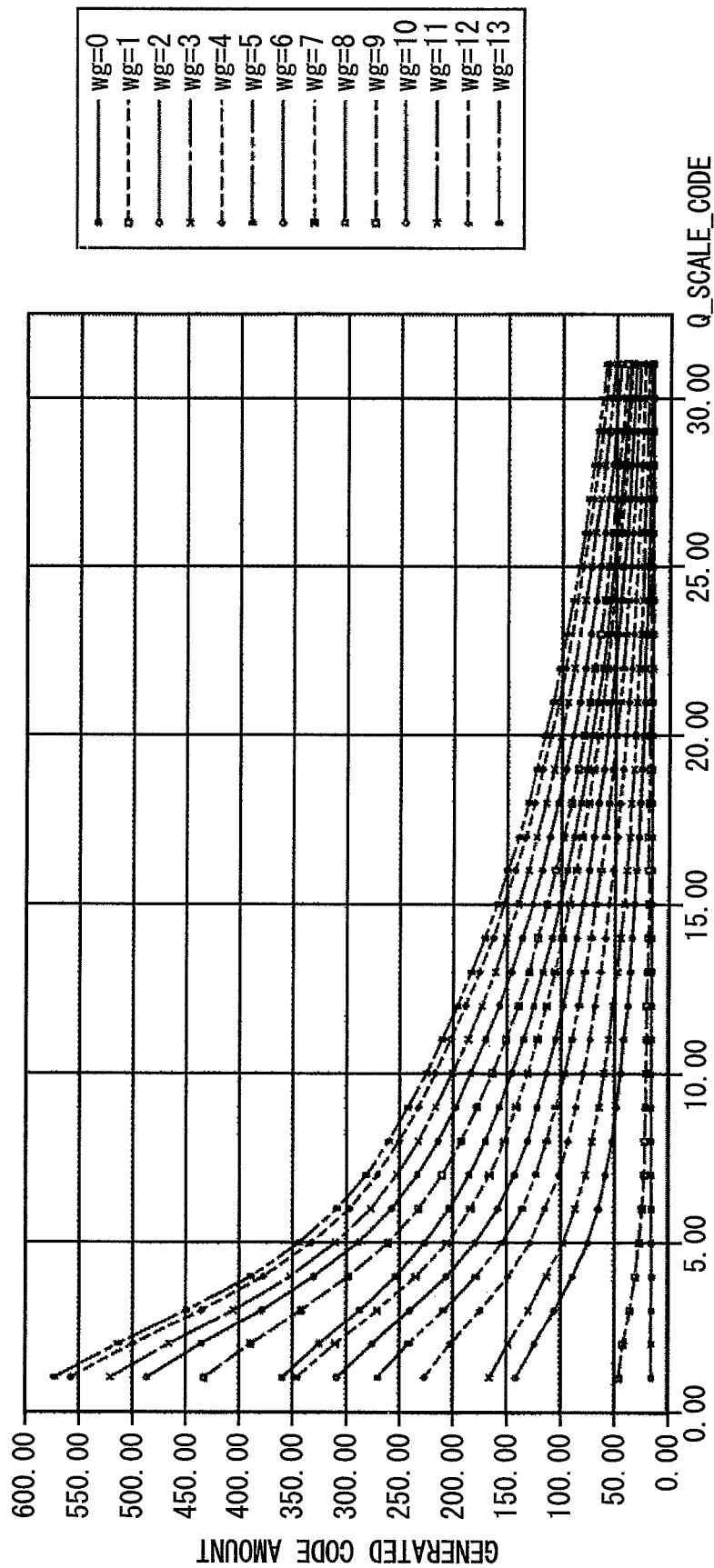
FIG. 4 is a chart showing statistically-determined transition curves (relationship between MB quantization values and generated amounts)

Now, FIG. 4 shows the statistically-determined transition curves (the relationship between an MB quantization value and a generated amount), which will now be described. This FIG. 4 shows the plots of the MB generated code amounts determined for each macroblock on all possible quantizer scales Q (Q=1 to 31), grouped in 13 levels depending on the amounts of generation of the macroblocks in an Intra-picture.

MPEG-2 or the like uses fixed Huffman tables for variable length coding, combining zero-runs and non-zero coefficients for coding in units of macroblocks. The higher value the quantizer scale Q has, the more the zero-run increases gradually and the lower the non-zero coefficients become in level. The increasing quantizer scale Q thus results in a monotonic decrease. It has been confirmed that macroblocks of different images tend to trace similar decreasing curves if the macroblocks show similar amounts of generation for a certain value of quantizer scale Q. Focusing attention to this characteristic tendency, one of the characteristics of the coding apparatus according to the present embodiment consists in that the intended target code amounts Target$_{MB}$ are determined in the form of MB generated code amounts by using the result of a single temporary coding (fixed quantizer scale QI).

That is, the coding apparatus stores the MB generated code amounts of quantized data for prediction, obtained when quantizing each of a plurality (here, thirteen) of pieces of image data having different MB generated code amounts on all the quantizer scales Q, as relationship information in a not-shown ROM (Read Only Memory), for example. Based on the MB generated code amount on the fixed quantizer scale QI selected, the coding apparatus can thus select quantized data for prediction closest to that MB generated code amount, and predict the MB generated code amounts of the selected quantized data for prediction as the MB generated code amounts on the respective quantizer scales Q.

Next, the characteristic of the pre-encoding by the precoder 1 will be described in more detail.

Initially, code amount prediction processing of the picture code amount prediction section 19 will be described in detail.

In the coding apparatus according to the first embodiment, the amounts of generation of macroblocks are calculated about quantized data that is quantized by the precoder 1 on the fixed quantizer scale QI, based on the code lengths of the Huffman table that is actually used for coding. For example, the MB generated code amounts on the fixed quantizer scale QI (Q=10) are classified into 16 groups based on the upper four bits of the MB generated code amounts, provided that the MB generated code amounts fall within 0 to 512 bytes or so. Based on this classification, it is determined which of the curves of FIG. 4 to use when predicting MB generated code amounts. Since the transition curves previously shown in FIG. 4 differ between intra macroblocks and inter macroblocks, different predictive curves are used for respective prediction modes including intra MB (MB_Intra), forward predictive MB (MB_FW), backward predictive MB (MB_BW), and bidirectional MB (MB_BI).

Specifically, the picture code amount prediction section 19 contains a group threshold range on a group-by-group basis. The picture code amount prediction section 19 then judges which of the group range thresholds the MB generated code amount of a macroblock at the fixed quantizer scale QI falls on, and classifies the macroblock into the corresponding group.

The prediction curves can be expressed as VirBit[mb_mode][q_scale][byte_group].

Here, mb_mode is the prediction mode of the macroblock (four modes), q_scale is the value of the quantizer scale Q selected from quantization indexes of 1 to 31, and byte_group is the 16 possible groups of classification by the MB generated code amount.

The MB generated code amount GenBitPic(q_scale) for an entire screen (by picture) on a quantizer scale Q (q_scale) can be determined as many as the 31 possible quantizer scales Q (q_scale), by the following equation:

$$\text{GenBitPic}(q\_scale) = \Sigma \text{VirBit}[mb\_mode][q\_scale][byte\_group] \quad (1)$$

That is, the picture code amount prediction section 19 selects a prediction mode mb_mode, a fixed quantizer scale QI, and a group byte_group (prediction curve) classified by the MB generated code amount on the fixed quantizer scale QI for each macroblock. Then, the picture code amount prediction section 19 can predict the MB generated code amounts on quantizer scales Q other than the fixed quantizer scale QI that is shown by the selected prediction curve corresponding to this group byte_group, as the MB generated code amounts on the quantizer scales Q other than the fixed quantizer scale QI. The picture code amount prediction section 19 can also predict the picture generated code amount of each picture by adding up the MB generated code amounts on the quantizer scales Q other than the fixed quantizer scale QI for each picture.

Here, the picture code amount prediction section 19 can determine the predicted amounts of generation of macroblocks based on the prediction curves (transition curves), provided that it retains information corresponding to the prediction modes mb_mode and the groups byte_group as relationship information (i.e., relationship information (prediction curves) indicating the relationship between the quantizer scales Q and the MB generated code amounts corresponding to all the groups (all prediction quantized data) with respect to each prediction mode mb_mode).

Next, description will be given in detail of how the picture code amount prediction section 19 handles activities. It is considered that byte_group which is classified by the picture code amount prediction section 19 based on the MB generated code amounts includes more complicated image information as the MB generated code amounts of the macroblocks are greater.

The processing to increase quantizer scales Q for complicated blocks can be achieved by offsetting each group byte_group. Assuming that this activity offset is λ[q_scale][byte_group], for example, activities of ±4 or so can be given to a quantizer scale Q (for example, q_scale=15) by the following equation:

$$\lambda[15][byte\_group] = \{-4,-4,-3,-3,-2,-2,-1,0,1,2,2,3,3,4,4,4\} \quad (2)$$

That is, the picture code amount prediction section 19 sets offsets for respective quantizer scales Q and respective groups byte_group. Suppose, for example, that the quantizer scale Q (q_scale) to predict an MB generated code amount on is "15" and the MB generated code amount belongs to the third smallest group, then the picture code amount prediction section 19 adds "−3," the third from the left in equation (2), to the quantizer scale Q (q_scale) of "15."

In general, activities need not be used when quantizer scales Q (q_scale) are small. It is therefore preferable that the offset range is changeable with the quantizer scale Q (q_scale), and the range is increased as the quantizer scale Q (q_scale) increases.

Using this λ, the predicted value of the picture generated code amount GenBitPic for an entire screen is given by the following equation:

$$\text{GenBitPic}(q\_scale\_pic) = \Sigma \text{VirBit}[mb\_mode][act\_q\_scale][byte\_group] \quad (3)$$

That is, the picture code amount prediction section 19 predicts the picture generated code amount based on a quantizer scale Q, which is the quantizer scale Q to make a prediction on (fixed to each picture) to which the activity-based offset is added. Here, the picture code amount prediction section 19 performs the addition of an offset and the prediction of the MB generated code amount based on the prediction curves for each macroblock. Then, the picture code amount prediction section 19 can add up the MB generated code amounts for each picture, thereby predicting the picture generated code amount GenBitPic based on the quantizer scale Q to make a prediction on.

$$act\_q\_scale(q\_scale\_pic) = \min(\max(1, q\_scale\_pic + \lambda[q\_sale\_pic][byte\_group]), 31) \quad (4)$$

Here, in equation (4), min(a,b) represents the smaller value between a and b, and max(c,d) represents the greater value between c and d.

That is, if the result of adding an activity offset to the quantizer scale Q to make a prediction on falls below "1," the picture code amount prediction section 19 sets the activity-offset quantizer scale Q to "1." If the result of adding an activity offset to the quantizer scale Q to make a prediction on exceeds "31," the picture code amount prediction section 19 sets the activity-offset quantizer scale Q to "31." In other words, the picture code amount prediction section 19 is configured to select the activity-offset quantizer scale Q from among "1 to 31" which are determined by the quantization indexes.

The picture code amount prediction section 19 can thus determine the picture generated code amounts on all the quantizer scales Q of the entire screen (q_scale_pic=1 to 31) on a picture-by-picture basis, and derives a quantizer scale Q (q_scale_target) close to the intended picture target code amount as an average quantizer scale Qa.

Next, description will be given in detail of quantization index determination processing of the macroblock code amount control section 3. In the macroblock-by-macroblock basis code amount control by the macroblock code amount control section 3, the basic quantizer scale $Q_{MB}$ of a macroblock and the intended MB target code amount $Target_{MB}$ of the macroblock can be predicted as the following equations.

$$Q_{MB}=act\_q\_scale(q\_scale\_target) \quad (5)$$

That is, the macroblock code amount control section 3 adds an activity-based offset to the average quantizer scale Qa, thereby determining the basic quantizer scale $Q_{MB}$.

$$Target_{MB}=VirBit[mb\_mode][Q_{MB}][byte\_group] \quad (6)$$

The macroblock code amount control section 3 predicts the MB generated code amount predicted for each macroblock on the basic quantizer scale $Q_{MB}$ as the MB target code amount $Target_{MB}$.

That is, the coding apparatus contains the relationship between the MB generated code amounts of the plurality of pieces of quantized data for prediction having different MB generated code amounts and the MB generated code amounts on the respective quantizer scales Q, in the form of the prediction curves. The coding apparatus then groups macroblocks to be predicted based on the fixed quantizer scale QI and the MB generated code amounts on the fixed quantizer scale QI, and applies them to quantized data for prediction. The coding apparatus then predicts the MB generated code amounts of this applied quantized data for prediction on the quantizer scales Q other than the fixed quantizer scale QI from the MB generated code amounts of the applied quantized data for prediction.

That is, the coding apparatus can predict the MB generated code amounts for the cases of using the quantizer steps based on all the possible quantizer scales Q, through a single process of coding using the quantizer step based on the fixed quantizer scale QI.

In the actual encoding by the parameter encoder 2, parameter encoding is performed using the picture type, macroblock modes, motion vectors, and the basic quantizer scales $Q_{MB}$ of the macroblocks predicted which are determined by the precoder 1. It should be appreciated that the information on the MB generated code amounts of the macroblocks are fed back for code amount control as described above.

Consequently, the coding apparatus is configured so that it can set basic quantizer scales $Q_{MB}$ and MB target code amounts $Target_{MB}$ appropriate for an image based on the MB generated code amounts predicted, and can perform a so-called feedforward code amount control.

As has been described above, according to the coding apparatus and method of the first embodiment of the present invention, it is possible to determine the predicted values of the basic quantizer scales $Q_{MB}$ and MB target code amounts $Target_{MB}$ in units of macroblocks with high accuracy.

(1-2) Procedure of Coding Processing

Next, coding processing to be executed according to a coding program will be described with reference to the flowcharts of FIGS. 2 and 3.

When the input video signal is supplied, the precoder 1 of the coding apparatus starts a coding processing procedure RT1. At step S1, the precoder 1 periodically assigns picture types based on the GOP period and the initial setting value M for determining the I- and P-picture periods, and proceeds to the next step S2.

At step S2, the precoder 1 determines an optimum prediction mode (mb_mode) based on the target image to be coded, shown by the input video signal, and a predictive picture to be predicted. The precoder 1 generates differential image data SAD using the optimum prediction mode, and proceeds to the next step S3.

At step S3, the precoder 1 performs an orthogonal transformation on the differential image data SAD by integer precision DCT in units of macroblocks. The precoder 1 also performs quantization using the fixed quantizer scale QI, thereby generating quantized data, and proceeds to the next steps S4 and S6.

At step S4, the precoder 1 performs inverse quantization and IDCT on the quantized data to generate local differential image data SADL, and proceeds to the next step S5. At step S5, the precoder 1 makes the processing of step 2 performed on the subsequent target image with the local differential image data SADL as the predictive picture.

Figure 3:
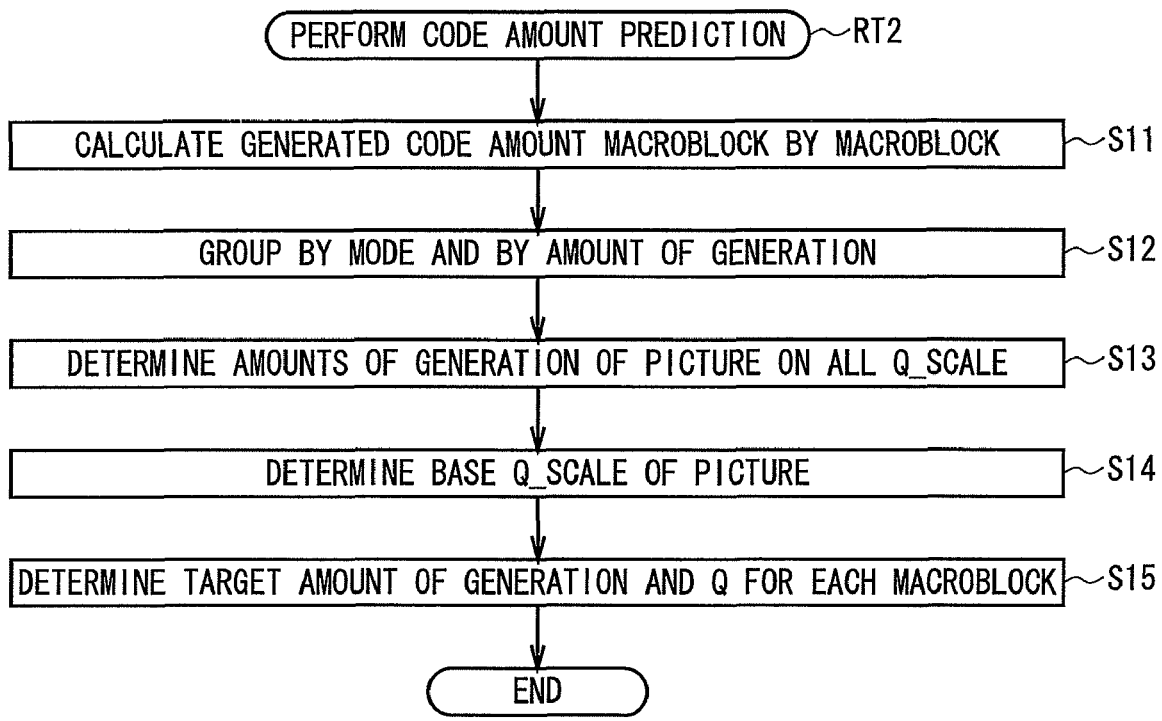
FIG. 3 is a flowchart detailing processing for code amount prediction.

At step S6, the precoder 1 proceeds to step S11 of a code amount prediction processing procedure RT2 (FIG. 3).

At step S11, the precoder 1 codes the quantized data to generate a coded stream as temporary quantized data by using the code length calculation section 17. The precoder 1 thereby calculates the MB generated code amounts of respective macroblocks (i.e., the MB generated code amounts of the temporary quantized data) on the fixed quantizer scale QI, and proceeds to the next step S12.

At step S12, the precoder 1 assigns the macroblocks to be predicted to one prediction curve (group) out of the plurality of prediction curves stored (for example, 16 curves prepared for each prediction mode) based on the prediction mode determined at step S2 and the MB generated code amounts calculated at step 11, by using the grouping section 18 for code amount. The precoder 1 then proceeds to the next step S13.

At step S13, the precoder 1 calculates the MB generated code amounts on all the quantizer scales Q (q_scale) for each picture by using the picture code amount prediction section 19, and proceeds to the next step S14.

Here, the precoder 1 calculates adaptive quantizer scales Qt (act_q_scale), which are the quantizer scales Q with increased/decreased activity offsets, as shown in equation (2) depending on which macroblock is assigned to which group. The precoder 1 calculates the MB generated code amounts of the respective macroblock on the adaptive quantizer scales Qt (act_q_scale) from the assigned prediction curves as shown in equation (3).

Then, the precoder 1 adds up the MB generated code amounts of the respective macroblocks for each picture, thereby calculating the picture generated code amounts of each picture as the picture generated code amounts on the respective quantizer scales Q.

At step S14, the precoder 1 selects a quantizer scale Q that leads to MB generated code amounts smaller than and closest to the picture target code amount as an average quantizer scale Qa (q_scale_target). The precoder 1 then proceeds to the next step S15.

At step S15, the precoder 1 determines adapted quantizer scales Qt (act_q_scale) of the average quantizer scale Qa as basic quantizer scales $Q_{MB}$ as shown in equation (5), and the MB generated code amounts of the respective macroblocks on the basic quantizer scales $Q_{MB}$ as the target code amounts $Target_{MB}$. The precoder 1 ends the code amount prediction processing procedure RT2, returns to step S6 of the coding processing procedure RT1 (FIG. 2), and proceeds to the next step S7.

At step S7, the macroblock code amount control section 3 controls the parameter encoder 2 by code amount control using the basic quantizer scales $Q_{MB}$ and the MB target code amounts $Target_{MB}$. In the meantime, at step S8, the macroblock code amount control section 3 makes the parameter encoder 2 perform actual encoding to generate an actual coded stream (i.e., actual quantized data), and proceeds to the end step to end the processing.

(1-3) Operation and Effect

According to the foregoing configuration, the coding apparatus selects quantizer steps for respective macroblocks, which are quantization units, based on the fixed quantizer scale QI, which is a quantizer scale QI selected, from among a plurality of quantizer steps based on a plurality of quantizer scales Q. The coding apparatus quantizes DCT coefficient data, which is image data, with the quantizer steps selected, thereby generating temporary quantized data. Here, the coding apparatus calculates the generated code amounts of the respective macroblock units of the temporary quantized data as the MB generated code amounts.

The coding apparatus contains the relationship information on the plurality of pieces of quantized data for prediction having different MB generated code amounts at a quantizer step selected based on the fixed quantizer scale QI as the prediction curves, the relationship information indicating the relationship between the plurality of quantizer scales Q representing a plurality of quantizer steps and the MB generated code amounts.

The coding apparatus selects quantized data for prediction from the plurality of prediction curves based on the MB generated code amounts of the temporary quantized data and the fixed quantizer scale QI. Based on this selected quantized data for prediction, the coding apparatus predicts the MB generated code amounts for situations where the image data is quantized by using the quantizer steps based on the quantizer scales Q other than the fixed quantizer scale QI (i.e., unselected quantizer steps), from among a plurality of quantizer scale Q.

The coding apparatus can thus predict the MB generated code amounts for situations where the DCT coefficient data to be predicted is quantized with the plurality of quantizer steps based on the plurality of quantizer scales Q, by simply quantizing the intended DCT coefficient data with a single quantizer step selected based on the fixed quantizer scale QI. Consequently, the coding apparatus can reduce processing load for simplified configuration as compared to the conventional method where DCT coefficient data is quantized on a plurality of quantizer scales Q.

The coding apparatus predicts the picture generated code amount GenBitPic, which is the generated code amount of quantized data of each picture, a coding unit, by adding up the MB generated code amounts predicted. The coding apparatus can therefore predict the picture generated code amount GenBitPic by the simple processing of only adding up the MB generated code amounts predicted.

Moreover, the coding apparatus predicts the basic quantizer steps $Q_{MB}$ out of the plurality of quantizer steps based on the plurality of quantizer scales Q so that the picture generated code amount GenBitPic approaches the picture target code amount which is a target code amount of each picture.

In a conventional code amount control of feedback type, typified by TM5 mentioned above, the actual MB generated code amounts resulting from the basic quantizer scales $Q_{MB}$ are totally unknown, and large differences can occur between the MB target code amounts and the actual MB generated code amounts. In the conventional code amount control, it has sometimes been the case that inappropriate basic quantizer scales are set according to basic quantizer scales before switching, for example, when switching to a different sequence is effected in units of macroblocks. In such cases, the conventional code amount control has produced excessive amounts of code when entering a sequence. This requires that the amounts of code be suppressed in the last half of the picture, causing greater distortion in lower areas than in upper areas with noticeable deterioration in image quality.

In contrast, the coding apparatus can set appropriate basic quantizer steps $Q_{MB}$ according to the image shown by the picture, can bring the actual picture generated code amount GenBitPic close to the picture target code amount, and can suppress such deterioration in image quality.

The coding apparatus generates actual quantized data by quantizing DCT coefficient data for each macroblock. Here, the coding apparatus quantizes the DCT coefficient data with modified quantizer steps, which are the basic quantizer steps $Q_{MB}$ modified, so that the picture generated code amount GenBitPic of the actual quantized data approaches the picture target code amount.

Since the coding apparatus can thus change the basic quantizer steps $Q_{MB}$ when necessary, based on the amounts of code actually generated by the actual coding, it is possible to bring the picture generated code amount GenBitPic of the actual quantized data close to the picture target code amount.

Furthermore, the coding apparatus determines modified quantizer steps from modified quantizer scales $QS_{MB}$ which are the basic quantizer scales $Q_{MB}$ modified based on differences in the amount of code between the MB generated code amounts of the actual quantized data and the MB target code amounts $Target_{MB}$ which are the intended targets of the MB generated code amounts of the respective macroblock units.

Consequently, the coding apparatus can change the basic quantizer steps $Q_{MB}$ when necessary, by feedback control based on the differences between the MB generated code amounts of the actual quantized data and the MB target code amounts $Target_{MB}$. The coding apparatus can therefore quantize the DCT coefficient data appropriately without causing a partial deterioration in the image quality of the entire picture due to insufficient code amounts.

Moreover, the coding apparatus uses the MB generated code amounts that are predicted based on the predicted basic quantizer scales $Q_{MB}$, as the MB target code amounts $Target_{MB}$.

The coding apparatus can thus reduce the processing load since the MB target code amounts $Target_{MB}$, which are calculated to predict the picture generated code amount GenBitPic for determining the basic quantizer scales $Q_{MB}$, can be used as the MB target code amounts $Target_{MB}$ intactly.

Furthermore, the coding apparatus selects an average quantizer step Qa such that the picture generated code amount GenBitPic falls below the picture target code amount, and the picture generated code amount GenBitPic and the picture target code amount have a minimum difference therebetween. The coding apparatus predicts the basic quantizer steps $Q_{MB}$ by increasing/decreasing the offset $\lambda$, or activity adjusting value, to this average quantizer step Qa.

Consequently, the coding apparatus can modify the basic quantizer steps $Q_{MB}$ according to the image complexity; and can make quantization-based errors visually less noticeable by utilizing the human vision characteristic of being less prone to recognize errors in complicated images.

Moreover, the coding apparatus adds offsets $\lambda$ according to the quantized data for prediction (i.e., groups) to the average quantizer step Qa. The coding apparatus therefore has only to add the offsets $\lambda$ corresponding to the groups simply, and need not otherwise perform processing for adaptive quantization such as calculation of variances in the DCT coefficient data. This allows simplified processing.

The coding apparatus then quantizes the DCT coefficient data in units of pictures with a quantizer step that is based on the fixed quantizer scale QI (i.e., selected quantizer step). As a result, the coding apparatus can calculate the picture generated code amount GenBitPic without adaptive quantization. This allows simplified processing.

Furthermore, the coding apparatus contains the relationship information (i.e., a plurality of pieces of quantized data for prediction) for each picture type (i.e., prediction mode mb_mode), and selects quantized data for prediction from the relationship information according to the picture type.

The coding apparatus can thus improve the accuracy of prediction since it can predict the MB generated code amounts from the relationship information corresponding to the picture type.

Moreover, the coding apparatus generates the temporary quantized data by quantizing the DCT coefficient data, followed by Huffman coding which is variable length coding using a fixed table. The coding apparatus predicts the MB generated code amounts of the selected quantized data for prediction at quantizer steps based on the quantizer scales Q other than the fixed quantizer scale QI (i.e., unselected quantizer steps), as the MB generated code amounts for situations where the DCT coefficient data is quantized with the unselected quantizer steps.

The coding apparatus can thus predict the MB generated code amounts with high accuracy, by utilizing the characteristic that the higher value the quantizer scale Q has, the more the zero-run increases gradually and the lower the non-zero coefficients become in level, so that the MB generated code amounts decrease monotonically with the increasing quantizer scale Q.

Furthermore, the coding apparatus generates the image data by applying DCT processing, which is a predetermined orthogonal transformation processing, to a video input signal, which is the image data input. This allows improved coding efficiency.

Since the feedback during actual coding is precautionary processing for code amount control, the coding apparatus can predict ideal allocation of code amounts per picture, and can achieve Intra Frame CBR code amount control which is used in a VTR system and the like, for example, without conventional five stages of parallel processing. It is also possible to reduce temporally imbalanced distortions and the like ascribable to overuse of code amounts upon a sequence change, which is problematic in TM5 and other code amount controls of feedback type.

According to the foregoing configuration, the coding apparatus stores the relationship between the quantizer scales Q and the MB generated code amounts in advance, as to the plurality of pieces of quantized data for prediction having different MB generated code amounts. The coding apparatus then selects quantized data for prediction that shows the closest MB generated code amount from among the MB generated code amounts for situations where the image data is quantized on a fixed quantizer scale QI. The coding apparatus predicts the MB generated code amounts for situations where the image data is quantized with the quantizer scales Q other than the fixed quantizer scale QI, by assuming the MB generated code amounts of the selected quantized data for prediction on the quantizer scales Q other than the fixed quantizer scale QI as the MB generated code amounts on the quantizer scales Q other than the fixed quantizer scale QI on which the image data is quantized.

Consequently, by simply quantizing the image data with a quantizer step that is selected based on the fixed quantizer scale QI, the coding apparatus can predict the MB generated code amounts for situations where the image data is quantized with quantizer steps that are based on the quantizer scales Q other than the fixed quantizer scale QI (i.e., unselected quantizer steps). As a result, the present invention can achieve an image processing apparatus and an image processing method that can predict the generated code amounts at different quantizer steps accurately from the generated code amounts that are calculated with a fixed quantizer step, and can predict the generated code amounts at different quantizer steps by simple processing so as to allow a reduction of the circuits for calculation.

(2) Second Embodiment (2-1) Configuration of Coding Apparatus

Figure 5:
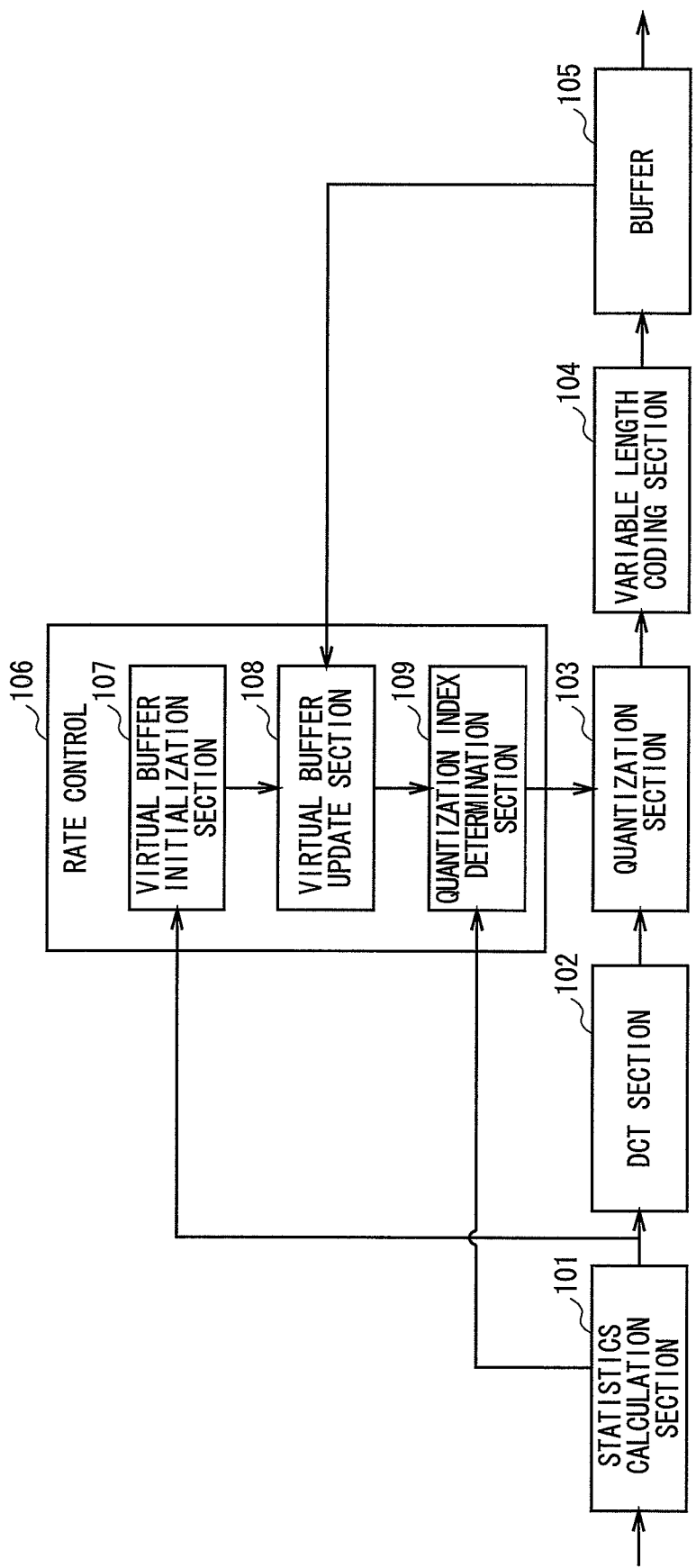
FIG. 5 is a block diagram of a coding apparatus according to the conventional art.

FIG. 5 shows the configuration of a coding apparatus according to conventional art, which will now be described.

As shown in the diagram, in this coding apparatus, a statistic amount calculation section 101 calculates the amount of bits of a target code amount allocated for a single frame. A DCT section 102 performs a discrete cosine transform, and transmits the DCT coefficient data to a quantization section 103. The quantization section 103 quantizes this DCT coefficient data on a quantizer scale, and transmits the quantized data to a variable length coding section 104. The variable length coding section 104 performs variable length coding on the quantized data, and transmits the resultant to a buffer 105. The buffer 105 stores the transmitted data temporarily, and outputs it as a bit stream. In the process of this processing, rate control is performed by a rate control section 106. More specifically, a virtual buffer initialization section 107 initializes a virtual buffer. A virtual buffer update section 108 updates the virtual buffer. A quantization index determination section 109 determines the quantizer scale Q to be used in the quantization section 103.

According to such conventional art, the virtual buffer has fixed values when encoding the top picture of a sequence or the picture immediately after a scene change. If the picture to be encoded has image content significantly different from the fixed values, then the feedback control on the quantizer scale Q has caused the quantizer scale Q to increase or decrease from upper to lower areas of the screen, with a deterioration in image quality. When the feedback control on the quantizer scale Q as in this conventional art is employed, a difference value between the MB generated code amount and the target code amount of each macroblock is used to determine the quantizer scale Q for the next macroblock. With the macroblock target code amount always constant, macroblock skips have sometimes occurred in an image that produces small amounts of code in upper areas of the screen and large amounts of code in lower areas of the screen, since code amounts can be assigned abundantly to upper areas of the screen and insufficiently to lower areas of the screen.

In view of this problem, one of the characteristics of a coding apparatus and method according to a second embodiment of the present invention consists in that encoding is performed with a fixed quantizer scale QI in advance, and the MB generated code amounts of the respective macroblocks are utilized to predict the average quantizer scale avgQ of the picture and the target code amounts $Target_{MB}$ of the macroblocks, whereby rate control is performed so that quantized values have a favorable distribution within the picture. Hereinafter, the configuration, operation, and effect thereof will be described in detail.

Figure 6:
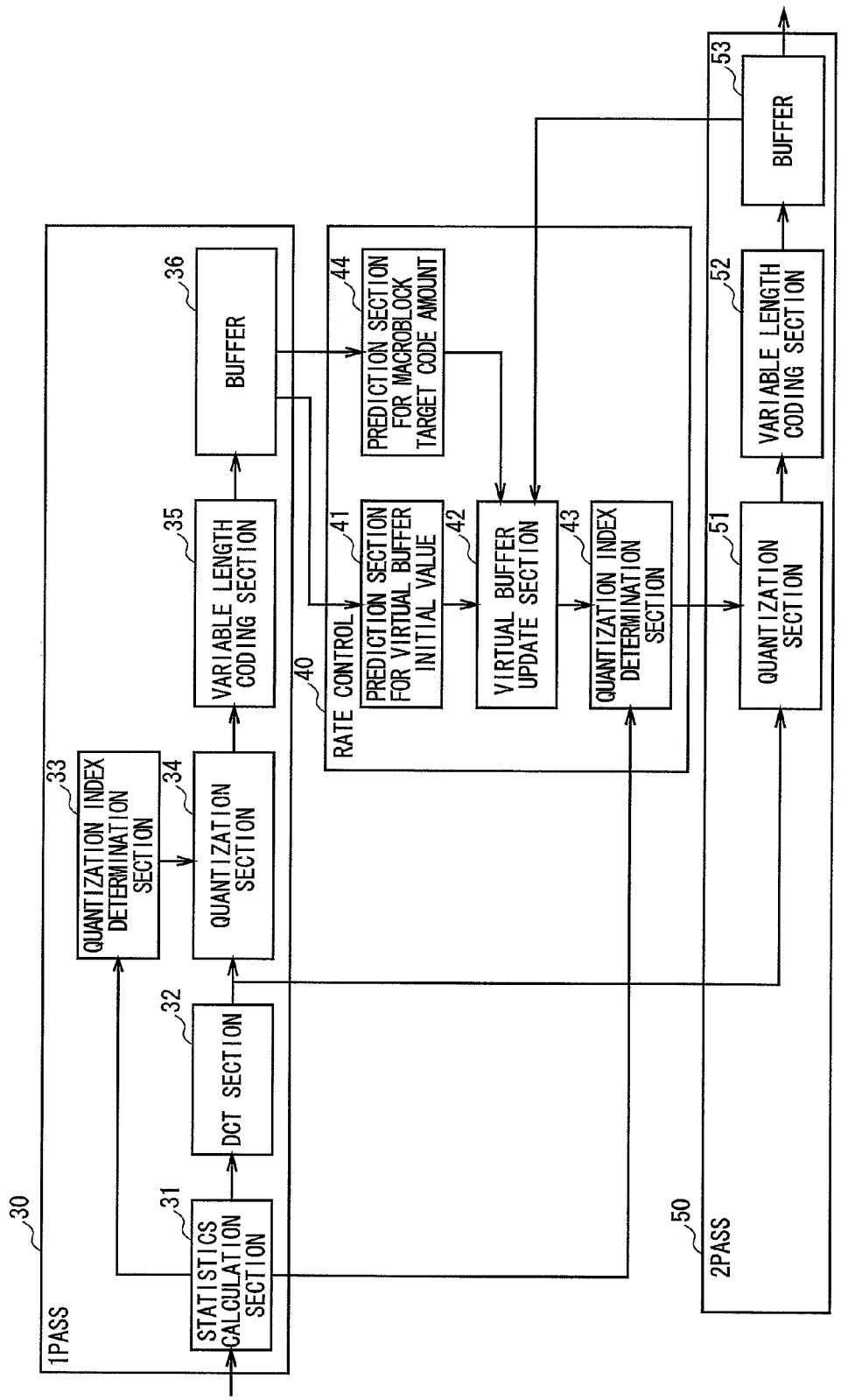
FIG. 6 is a block diagram of a coding apparatus according to a second embodiment of the present invention.

FIG. 6 shows the configuration of the coding apparatus according to the second embodiment of the present invention, which will now be described.

As shown in this FIG. 6, this coding apparatus supports MPEG-2, and includes a first-pass precoder 30, a rate control section 40, and a second-pass parameter encoder 50.

More specifically, the precoder 30 includes a statistic amount calculation section 31, a DCT section 32, a quantization index determination section 33, a quantization section 34, variable length coding section 35, and a buffer 36. The rate control section 40 includes a prediction section 41 for a virtual buffer initial value, a virtual buffer update section 42, a quantization index determination section 43, and a prediction section 44 for macroblock target code amount. The parameter encoder 50 includes a quantization section 51, a variable length coding section 52, and a buffer 53.

With the foregoing configuration, in the rate control section 40, rate control is performed in units of macroblocks. Then, two-pass encoding is performed on a picture-by-picture basis. That is, in the first-pass by precoder 30, encoding is performed on a fixed quantizer scale QI, and the MB generated code amounts for each macroblock are collected. In the second-path parameter encoder 50, an average quantizer scale avgQ of the picture and predicts the MB target code amounts Target$_{MB}$ of the respective macroblocks are predicted from the MB generated code amounts collected. Using these predicted values, the rate control section, which serves as rate control means, performs rate control through quantizer scale feedback such as in TM5.

Figure 7:
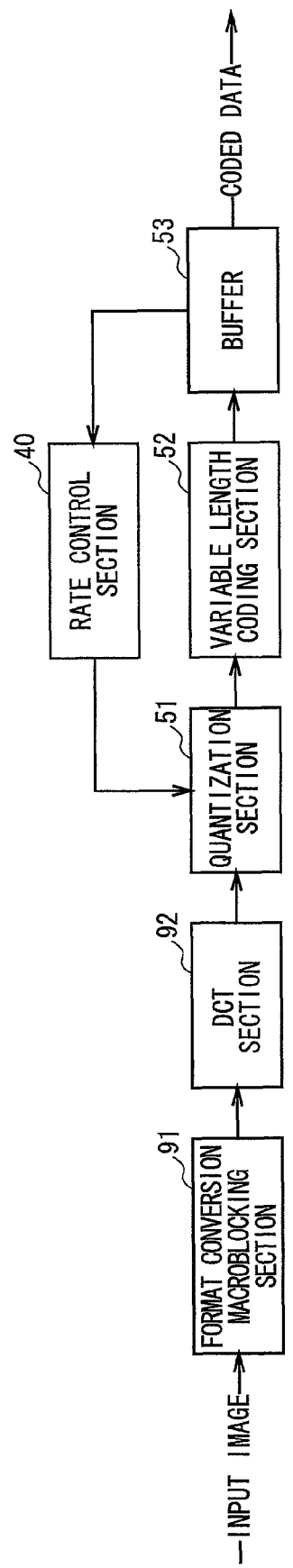
FIG. 7 is a block diagram of a modification of the coding apparatus according to the second embodiment of the present invention.

In the configuration of FIG. 6, the second-pass parameter encoder 50 includes no DCT section etc. Nevertheless, as shown in FIG. 7, the parameter encoder 50 is equivalent to the configuration including a format conversion macroblocking section 91, a DCT section 92, the quantization section 51, the variable length coding section 52, and the buffer 53. The rate control section 40 may be associated with this configuration.

Figure 8:
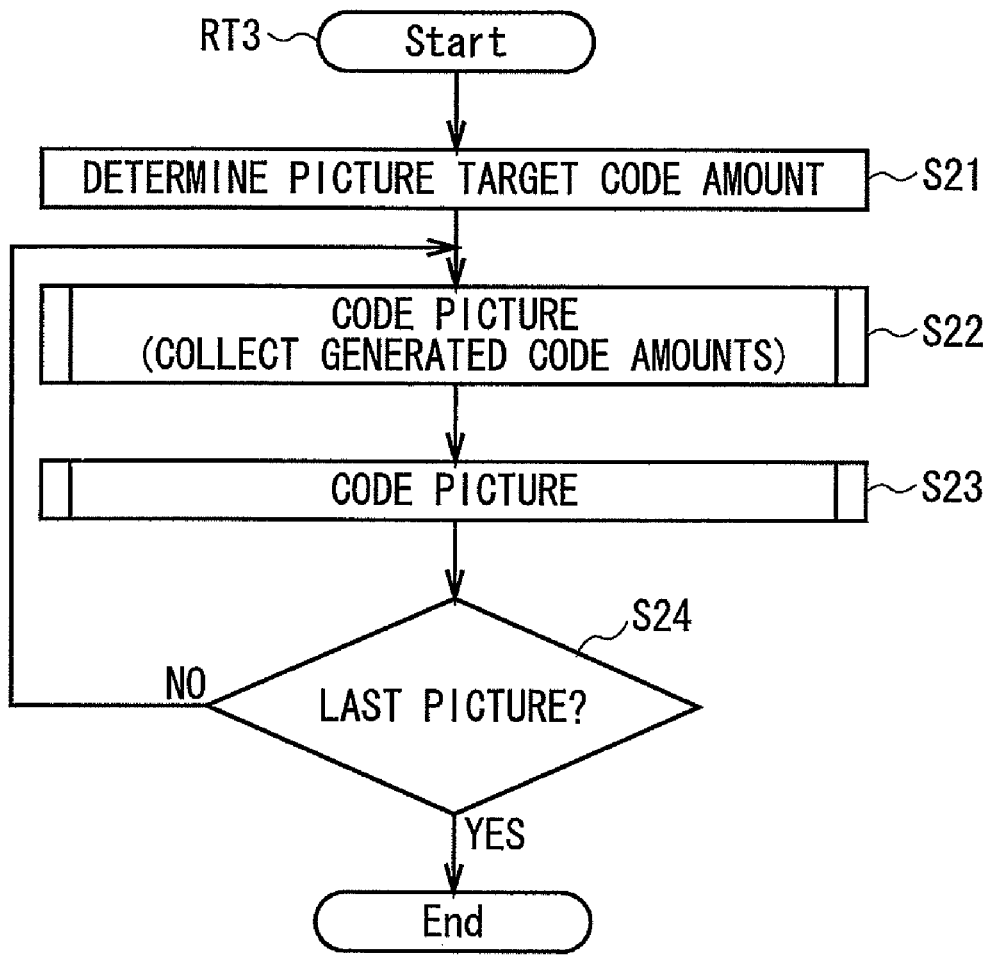
FIG. 8 is a flowchart detailing the coding processing of the coding apparatus according to the second embodiment of the present invention.

Now, referring to the flowchart of FIG. 8, description will be given of the rate control in the two-pass encoding by the coding apparatus according to the second embodiment. The statistic amount calculation section 31 calculates the amount of bits of the target code amount allocated for a single frame (step S21). For example, when performing 30 frames/sec coding at 50 Mbps, a VTR or other system with a constant code amount per frame calculates the picture target code amount pictBits based on a value that is determined by dividing 50 Mbps by the number of frames per second "30" (50 Mbps/30).

Here, the target code amount pictBits is determined by the following equations:

For I-picture, pictBits=$KI$×Bitrate/($KI$×$NI$+$KP$×$NP$+$KB$×$NB$);

For P-picture, pictBits=$KP$×Bitrate/($KI$×$NI$+$KP$×$NP$+$KB$×$NB$); and

For B-picture, pictBits=$KB$×Bitrate/($KI$×$NI$+$KP$×$NP$+$KB$×$NB$), where KI=5, KP=3, KB=1, Bitrate is the generated code amount per second, and NI, NP, and NB are the numbers of I-, P-, and B-pictures generated per second.

Subsequently, each picture is encoded twice by the first-pass precoder 30. That is, the first encoding is performed with a quantizer scale of fixed value, and the MB generated code amounts of the respective macroblocks are collected (step S22). For the second encoding, the rate control section 40 performs rate control by using the MB generated code amounts so that the quantizer scales Q have an appropriate distribution (step S23). Whether the picture is the last one or not is determined thus. The foregoing processing is repeated until the last picture (step S24). If the processing reaches the last picture, the processing is ended.

Figure 9:
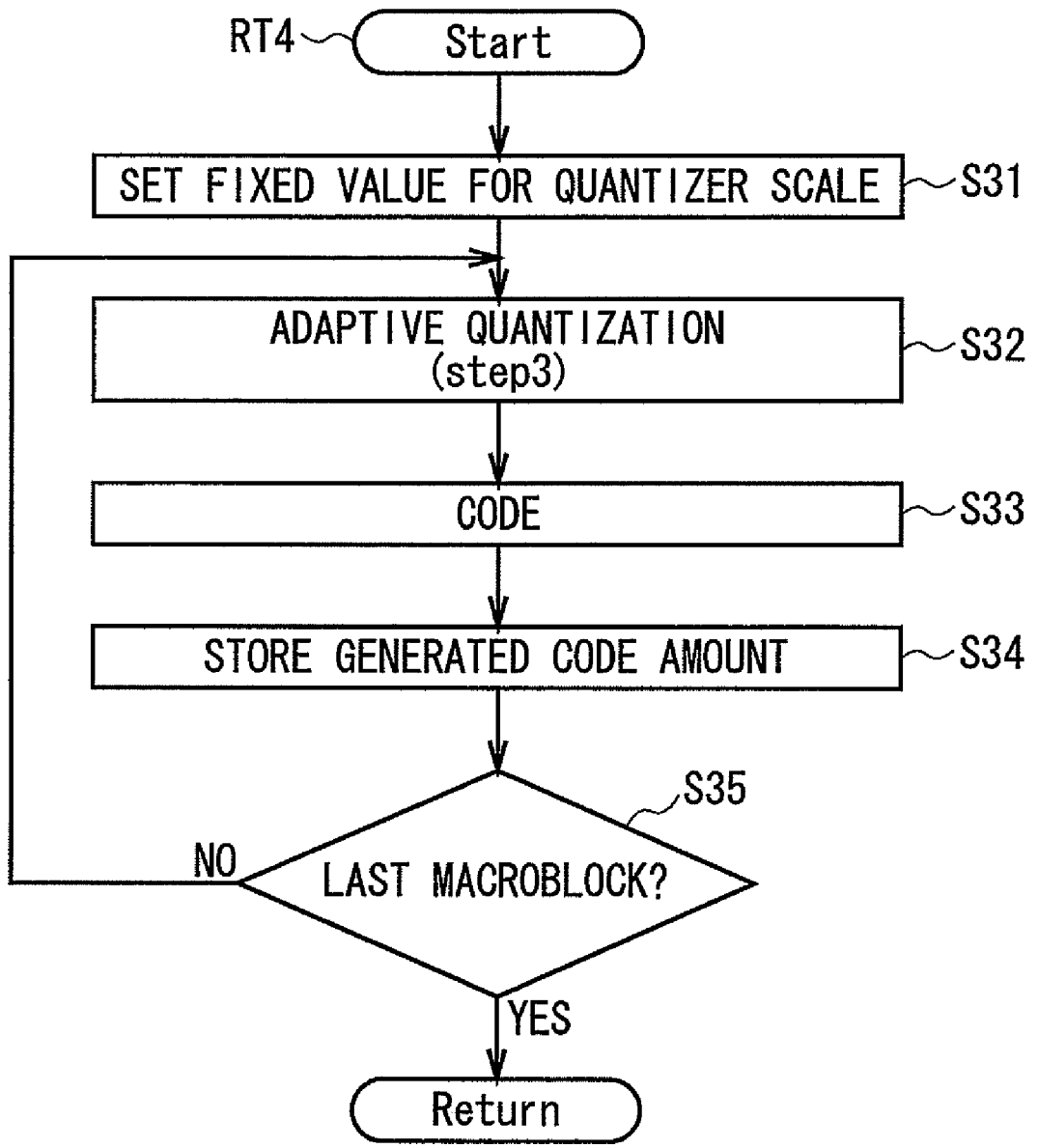
FIG. 9 is a flowchart showing the details of picture coding (collection of generated code amounts) by the coding apparatus according to the second embodiment of the present invention.

Now, the processing of the foregoing step S22 will be detailed in the flowchart of FIG. 9.

That is, the first encoding is intended to collect the MB generated code amounts. The quantizer scale Q is set to a fixed quantizer scale QI that is a fixed value (step S31). Adaptive quantization utilizing visual characteristics is also performed to determine a final adaptive quantizer scale Qt (step S32). The quantization section 34 performs quantization by using the adaptive quantizer scale Qt, and the variable length coding section 35 performs variable length coding (step S33). The resulting MB generated code amount is stored into the buffer 36 on a macroblock-by-macroblock basis (step S34). The above processing is repeated for each macroblock (step S35). If the processing reaches the last macroblock, the processing returns to step S23 and subsequent steps of FIG. 7.

Figure 10:
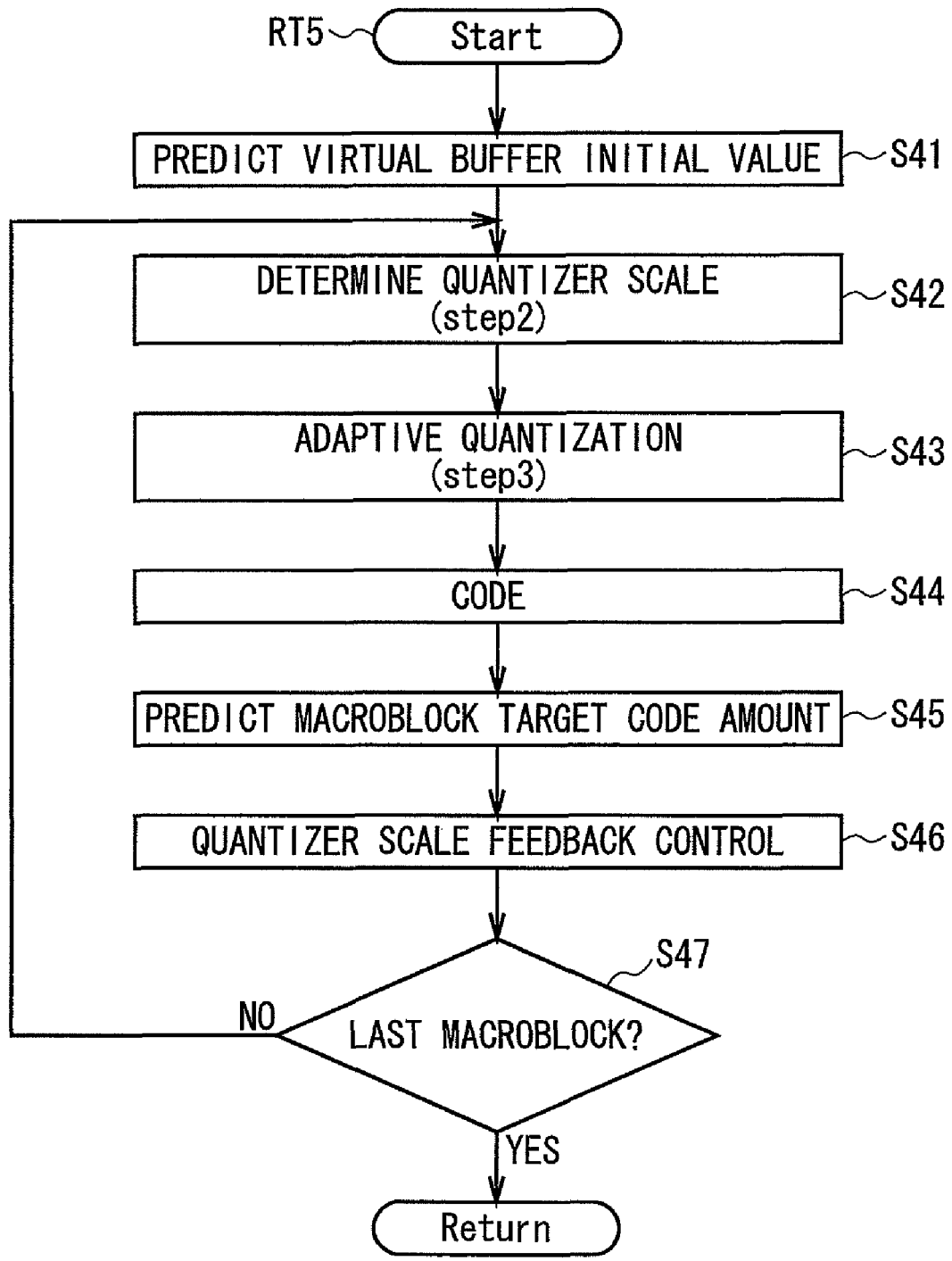
FIG. 10 is a flowchart showing the details of the picture coding by the coding apparatus according to the second embodiment of the present invention.

Next, the processing of the foregoing step S23 will be detailed in the flowchart of FIG. 10.

That is, for the second encoding, the correlation between the MB generated code amounts and the quantizer scales Q is statistically grasped in advance, and is stored as a conversion formula (relationship information). With this conversion formula, a quantizer scale that produces the picture generated code amount closest to the picture target code amount pictBits among the picture generated code amounts of the first encoding is predicted as an average quantizer scale avgQ. An initial value of this virtual buffer, virtualBuf, is determined by the following equation (step S41):

$$virtualBuf = \frac{pictBits \times \frac{avgQ}{31}}{2} \quad (7)$$

where virtualBuf refers to the initial value of the virtual buffer, pictBits, the target code amount of the picture, and avgQ, the average quantizer scale of the picture.

That is, the initial value of the virtual buffer is calculated by multiplying the value of the average quantizer scale avgQ normalized by "31" and the picture target code amount pictBits, divided by "2." It follows that the initial value varies with the average quantizer scale avgQ and the picture target code amount pictBits.

After the virtual buffer is settled, a modified quantizer scale $QS_{MB}$ is calculated by the following equation for each macroblock, with the average quantizer scale avgQ as the basic quantizer scale $Q_{MB}$ (step S42):

$$QS_{MB} = 31 \times \frac{virtualBuf_{MB}}{pictBits} \times 2 \quad (8)$$

where $QS_{MB}$ refers to the modified quantizer scale of the macroblock, virtualBuf$_{MB}$, the virtual buffer at the time of processing the macroblock, and pictsBits, the picture target code amount.

That is, the modified quantizer scale $QS_{MB}$ is calculated by dividing the virtual buffer current value virtualBuf$_{MB}$ by the picture target code amount pictBits, multiplied by "31" and "2." Since the picture target code amount pictBits is fixed within the same picture, the modified quantizer scale $QS_{MB}$ varies with the virtual buffer current value $virtualBuf_{MB}$.

$$TargetBits_{MB} = \frac{pictBit \times GenBit_{MB}}{\sum_{k=0}^{numOfMB} GenBits_k} \quad (9)$$

where $TargetBits_{MB}$ is the target code amount of the macroblock, pictBits is the picture target code amount, $GenBits_{MB}$ is the MB generated code amount of the macroblock on the fixed quantizer scale QI, and numOfMB is the number of macroblocks in a single picture.

That is, the MB target code amount $Target_{MB}$ of the macroblock is calculated by calculating the ratio of the MB generated code amount $GenBits_{MB}$ on the fixed quantizer scale QI to the total sum of the MB generated code amount for a single picture, $\Sigma GenBits_{MB}$, as an MB ratio, and multiplying this MB ratio by the picture target code amount pictBits. In other words, the MB target code amount $Target_{MB}$ of the macroblock is calculated for situations where the MB generated code amounts for a single picture, $\Sigma GenBits_{MB}$, coincide with the picture target code amount pictBits, assuming that the MB ratio varies little regardless of the MB generated code amounts for a single picture $\Sigma GenBits_{MB}$.

After the modified quantizer scale $QS_{MB}$ is determined thus, adaptive quantization is performed by the quantization section 34 as in the first encoding (step S43). Variable length coding is performed by the variable length coding section 35 (step S44). In order to bring the picture generated code amount close to the picture target code amount picBits, quantizer scale feedback control is performed. This is effected by using the modified quantizer scale $QS_{MB}$ which is the basic quantizer scale $Q_{MB}$ increased/decreased according to a difference between the actual MB generated code amount gen$Bits_{MB}$ and the MB target code amount $Target_{MB}$.

In fact, the virtual buffer update section 42 adds the difference between the actual MB generated code amount gen$Bits_{MB-1}$ and the target code amount $Target_{MB}$ to the virtual buffer on the macroblock-by-macroblock basis (step S46). The virtual buffer current value $virtualBufM_{MB}$ is determined by the following equation. The reason for using the MB generated code amount genBits$_{MB-1}$ of the previous macroblock is that actual coding entails delay.

$virtualBuf_{MB}=virtualBuf_{MB-1}+(genBits_{MB-1}-Target-Bits_{MB})$ (10)

That is, the virtual buffer current value $virtualBuf_{MB}$ hardly varies if the difference in the amount of code between the actual MB generated code amount genBits$_{MB-1}$ and the target code amount $Target_{MB}$ is small. The virtual buffer current value $virtualBuf_{MB}$ varies greatly if the difference in the amount of code is large.

Consequently, the value of the modified quantizer scale $QS_{MB}$ calculated by equation (8) is determined with little modification to the basic quantizer scale $Q_{MB}$ (average quantizer scale Qavg) if the difference in the amount of code between the actual MB generated code amount genBits$_{MB-1}$ and the MB target code amount $Target_{MB}$ is small. On the other hand, if the difference in the amount of code between the actual MB generated code amount genBits$_{MB-1}$ and the target code amount $Target_{MB}$ is large, the value of the modified quantizer scale $QS_{MB}$ is determined to that of the basic quantizer scale $Q_{MB}$ modified according to the virtual buffer current value $virtualBuf_{MB}$.

The above processing is repeated for each macroblock. That is, it is determined whether or not the processing is done up to the last macroblock (step S47), and the foregoing processing is repeated until the last macroblock. When the processing is done up to the last macroblock is reached, it returns to that shown in FIG. 8.

As has been described above, according to the coding apparatus and method of the second embodiment of the present invention, it is possible to perform encoding with quantizer scales of favorable distribution irrespective of the image content of the previous picture. This leads to improved image quality. It is also possible to perform rate allocation on a macroblock-by-macroblock basis more accurately irrespective of the image content of the picture, with an improvement in image quality. Consequently, some images can be prevented from macroblock skips in lower areas of the screen ascribable to insufficient amounts of code.

(2-2) Procedure of Coding Processing

Next, coding processing to be executed according to a coding program will be described with reference to the flowcharts of FIGS. 8 to 10.

When a video input signal is supplied as image data, the coding apparatus starts a coding processing procedure RT3. At step S21, the coding apparatus determines the picture target code amount pictBits by using the statistic amount calculation section 31 of the precoder 30, and proceeds to the next step S22.

At step S22, the coding apparatus proceeds to step S31 of a code amount prediction processing procedure RT4 (FIG. 9) where the image data is encoded with a fixed quantizer scale QI, in order to collect generated code amounts by using the precoder 30.

At step S22, the precoder 30 applies DCT processing to the image data by using the DCT section 32, and determines the fixed quantizer scale QI by using the quantization index 33. The precoder 30 then proceeds to the next step S32.

At step S32, the precoder 30 subjects the DCT-transformed image data to adaptive quantization adaptive to the image complexity using the fixed quantizer scale QI, by using the quantization section 34. The precoder 30 then proceeds to the next step S32.

At step S33, the precoder 30 performs variable length coding on the adaptively-quantized image data to generate temporary quantized data by using the variable length coding section 35. The precoder 30 then proceeds to the next step S34. At step S34, the precoder 30 temporarily stores the MB generated code amount GenBits$_{MB}$ of each macroblock of the temporary quantized data into the buffer 36, and proceeds to the next step S35.

At step S35, the precoder 30 determines whether or not the macroblock to be processed by the statistic amount calculation section 31 is the last macroblock of the current picture. If the result is negative, the precoder 30 returns to step S32 to continue the code amount prediction processing.

On the other hand, if the result at step S35 is positive, which indicates that the code amount prediction processing is to be performed on the next picture, then the precoder 30 returns to step S22 of the coding processing procedure RT3 and proceeds to the next step S23.

At step S23, the coding apparatus proceeds to step S41 of an actual coding processing procedure RT5 (FIG. 10) where the image data is coded while rate control is performed based on the MB generated code amounts GenBits$_{MB}$ calculated at step S22.

At step S41, the rate control section 40 of the coding apparatus calculates an average quantizer scale avgQ based on the MB generated code amounts GenBits$_{MB}$ calculated at step S22. The rate control section 40 also calculates the initial value of the virtual buffer, virtualBuf, according to the aforementioned equation (7) based on the average quantizer scale avgQ by using the prediction section 41 for a virtual buffer initial value. The rate control section 40 sets this initial value virtualBuf into the virtual buffer update section 42, and proceeds to the next step S42.

At step S42, the rate control section 40 determines a modified quantizer scale $QS_{MB}$, which is the basic, quantizer scale $Q_{MB}$ (average quantizer scale Qavg) modified according to the virtual buffer current value virtualBuf$_{MB}$, according to equation (8) with the average quantizer scale avgQ as the basic quantizer scale $Q_{MB}$ by using the quantization index determination section 43. The rate control section 40 then proceeds to step S43.

At step S43, the rate control unit 40 determines an adaptive quantizer scale $QSt_{MB}$ adaptive to the complexity (activity) of the image data based on the modified quantizer scale $QS_{MB}$ by using the quantization index determination section 43. Then, the rate control section 40 controls the quantization section 51 of the parameter encoder 50 so that the quantization section 51 performs quantization using this adaptive quantizer scale $QSt_{MB}$, and proceeds to the next step S44.

It follows that the quantization section 51 quantizes the DCT-processed image data (DCT coefficient data) that is supplied from the DCT section 32 of the precoder 30, by using this adaptive quantizer scale $QSt_{MB}$.

At step S44, the parameter encoder 50 performs variable length coding on the quantized data quantized at step S44 by using the variable length coding section 52, thereby generating a coded stream as temporary quantized data. The parameter encoder 50 temporarily stores this coded stream into the buffer 53, and proceeds to the next step S45.

At step S45, the rate control section 40 calculates the MB target code amount Target$_{MB}$ for the next macroblock of the macroblock according to equation (9) based on the picture target code amount pictBits that is determined at step S21 and the MB generated code amount GenBits$_{MB}$ that is temporarily stored in the buffer 36. The rate control section 40 then proceeds to the next step S46.

At step S46, the rate control section 40 calculates the virtual buffer current value virtualBuf$_{MB}$ according to equation (10) based on the next MB target code amount Target$_{MB}$ and the actual MB generated code amount genBits$_{MB-1}$ of the macroblock, temporarily stored in the buffer 53 at step S44, by using the virtual buffer update section 42. The rate control section 40 sets this virtual buffer current value virtualBuf$_{MB}$ into the virtual buffer update section 42, and proceeds to the next step S47.

It follows that the virtual buffer current value virtualBuf$_{MB}$ is updated in succession based on a difference in the amount of code between the MB target code amount Target$_{MB}$ and the actual MB generated code amount genBits$_{MB-1}$, then calculated by using the virtual buffer current value virtualBuf$_{MB}$.

At step S47, the rate control section 40 determines whether or not the macroblock to be processed is the last block. If the result is negative, the rate control section 40 returns to step S42 to continue the actual coding processing.

On the other hand, if the result at step S47 is positive, which indicates that the processing is to be performed on the next picture, then the coding apparatus returns to step S23 of the coding processing procedure RT3 (FIG. 8) and proceeds to the next step S24.

At step S24, the coding apparatus determines whether or not the processed picture is the last picture. If the result is negative, the coding apparatus returns to step S22 to continue the coding processing.

On the other hand, if the result at step S24 is negative, the coding apparatus proceeds to the end step to end coding the processing.

(2-3) Operation and Effect

With the foregoing configuration, the coding apparatus determines the MB target code amount Target$_{MB}$ according to equation (9) by multiplying the MB generated code amount GenBits$_{MB}$ based on the fixed quantizer scale QI by the ratio of the picture target code amount pictBit to the picture generated code amount resulting from quantizer steps based on the fixed quantizer scale QI (i.e., quantizer steps based on adaptive quantizer scales Qt that are used for quantization) as selected quantizer steps.

It is considered that when the quantizer scale Q is changed here, the entire amount of code varies but with little change in proportion by which the code amount of the macroblock actually occupies the entire picture.

For this reason, the coding apparatus calculates the proportion by which the MB generated code amount GenBits$_{MB}$ occupies the picture generated code amount on the fixed quantizer scale QI, from the MB generated code amount GenBits$_{MB}$ based on the fixed quantizer scale QI. The coding apparatus then adjusts the scale of the code amount by multiplying this proportion by the ratio of the picture generated code amount on the fixed quantizer scale QI to the picture target code amount pictBit, thereby calculating the MB target code amount Target$_{MB}$.

Since the coding apparatus can perform feedback control based on the appropriate MB target code amount Target$_{MB}$ according to the image data, it is possible to reduce the difference in the amount of code between the MB target code amount Target$_{MB}$ and the actual MB generated code amount genBits$_{MB}$ even when switching image types, sequences, etc. Consequently, the coding apparatus can prevent situations such as running short of code amounts available for latter areas of a picture from occurring.

Moreover, the coding apparatus performs adaptive quantization with the fixed quantizer scale QI by using the precoder 30. The coding apparatus thereby selects a quantizer step based on the quantizer scale Q (i.e., a quantizer step based on an adaptive quantizer scale Qt) according to the image data for each macroblock, and quantizes the image data with the quantizer step selected.

The coding apparatus can thus calculate the picture generated code amount after the adaptive quantization by simply adding up the MB generated code amounts GenBits$_{MB}$.

Furthermore, the coding apparatus can make the parameter encoder 50 use the average quantizer scale Qavg as the basic quantizer scale $Q_{MB}$ intactly and perform adaptive quantization based on the modified quantizer scale $QS_{MB}$ that is calculated from the average quantizer scale Qavg according to equations (7) and (8). The coding apparatus can thus make quantization distortions less noticeable by means of adaptive quantization.

According to the foregoing configuration, the coding apparatus determines the basic quantizer scales $Q_{MB}$ from the relationship information based on the MB generated code amounts GenBits$_{MB}$ on the fixed quantizer scale QI, and determines the MB target code amounts Target$_{MB}$ based on the proportions in the amount of code by which the MB generated code amounts GenBits$_{MB}$ occupy the picture.

Consequently, the coding apparatus can code the entire picture appropriately according to the picture target code amount pictBit since it can set appropriate basic quantizer scales $Q_{MB}$ and MB target code amounts Target$_{MB}$ according to the image data.

(3) Third Embodiment

(3-1) Configuration of Coding Apparatus

The coding apparatus according to the second embodiment described above may be modified as shown below. In this third embodiment, a two-pass code amount prediction method performs feedback control in units of slices, using quantizer scales Q (q_scale) and MB generated code amounts of respective macroblocks determined from prediction curves.

Figure 11:
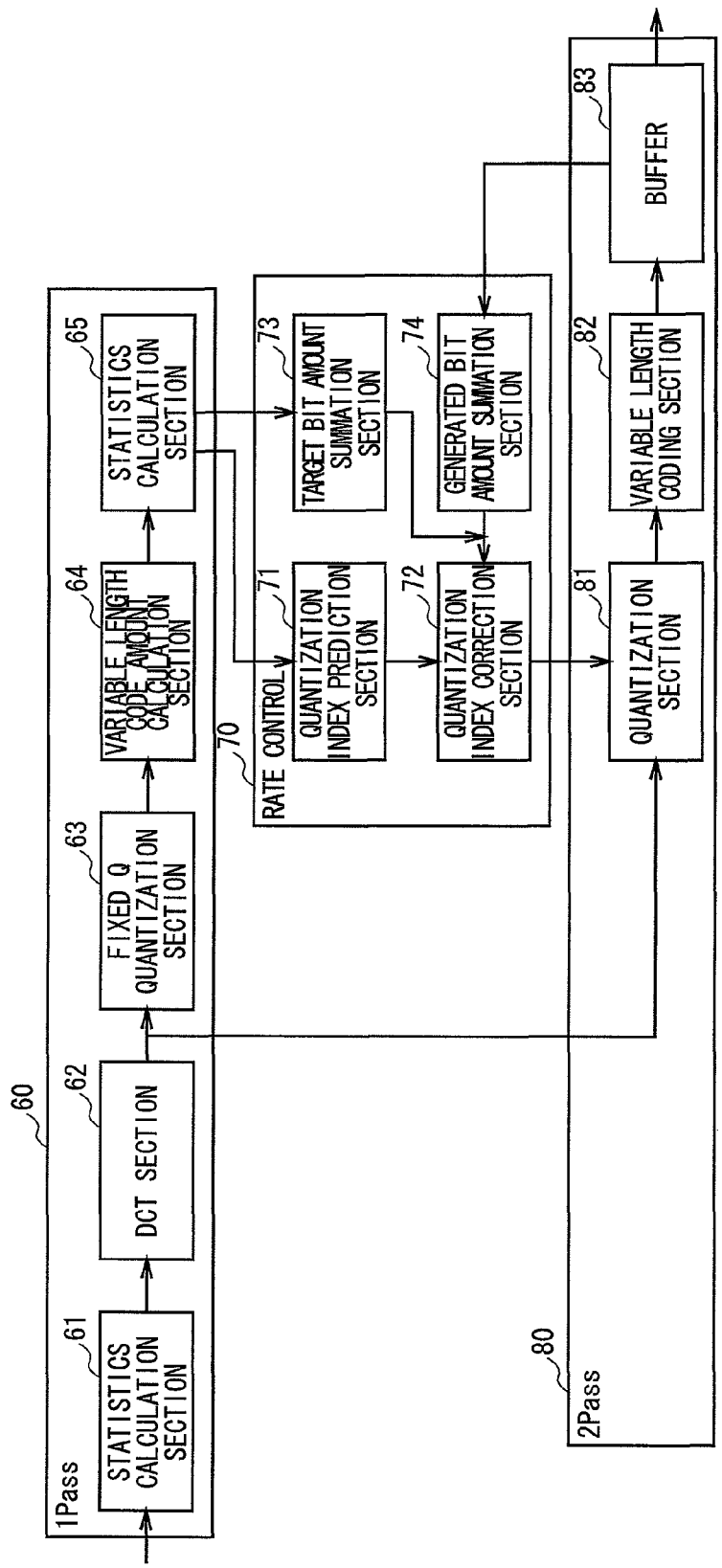
FIG. 11 is a block diagram of a coding apparatus according to a third embodiment of the present invention.

FIG. 11 shows the configuration of the coding apparatus according to the third embodiment, which will now be described. As shown in this FIG. 11, this coding apparatus includes a first-pass precoder 60, a rate control section 70, and a second-pass parameter encoder 80.

More specifically, the precoder 60 includes a statistic amount calculation section 61, a DCT section 62, a fixed Q quantization section 63, a variable length code amount calculation section 64, and a statistic amount calculation section 65. The rate control section 70 includes a quantization index prediction section 71, a quantization index correction section 72, a target bit amount summation section 73 for each slice, and a generated bit amount summation section 74 for each picture. The second-pass parameter encoder 80 includes a quantization section 81, a variable length coding section 82, and a buffer 83.

Now, referring to the flowcharts of FIGS. 12 and 13, the coding processing according to this modification will be described in detail. The main flow is the same as that of FIG. 8.

Figure 12:
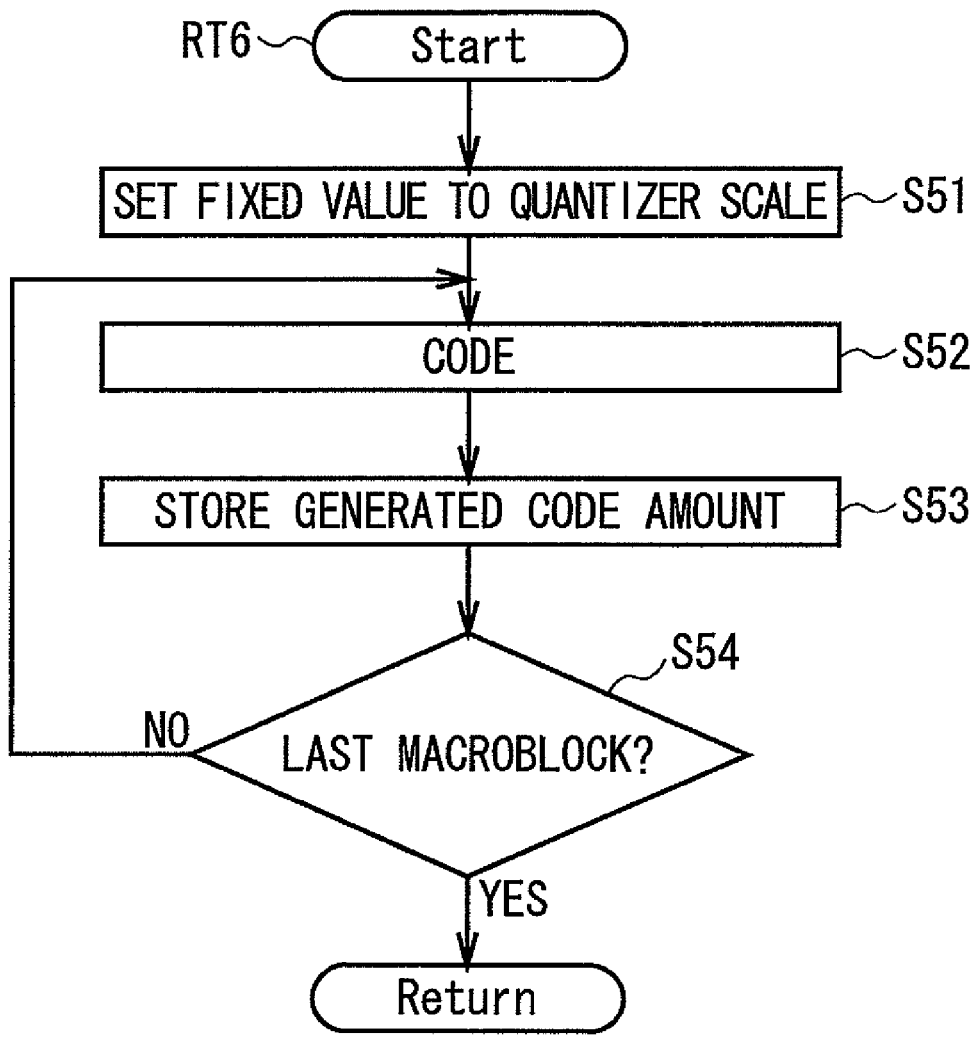
FIG. 12 is a flowchart showing the details of picture coding (collection of generated code amounts) by the coding apparatus according to the third embodiment of the present invention.

Initially, in picture encoding (MB generated code amount collection) processing of FIG. 12, a fixed value is set to the quantizer scale to be used in the fixed Q quantization section 63 (step S51). In the fixed Q quantization section 63, DCT coefficient data DCTed by the DCT section 62 is quantized on this fixed quantizer scale. In the variable length code amount calculation section 64, a variable length code amount is calculated (step S52), and the MB generated code amount is determined for each macroblock (step S53). Such processing is repeated for a single picture, and whether or not the processing is done up to the last macroblock is determined (step S54). When the processing is done up to the last macroblock, the processing returns.

Figure 13:
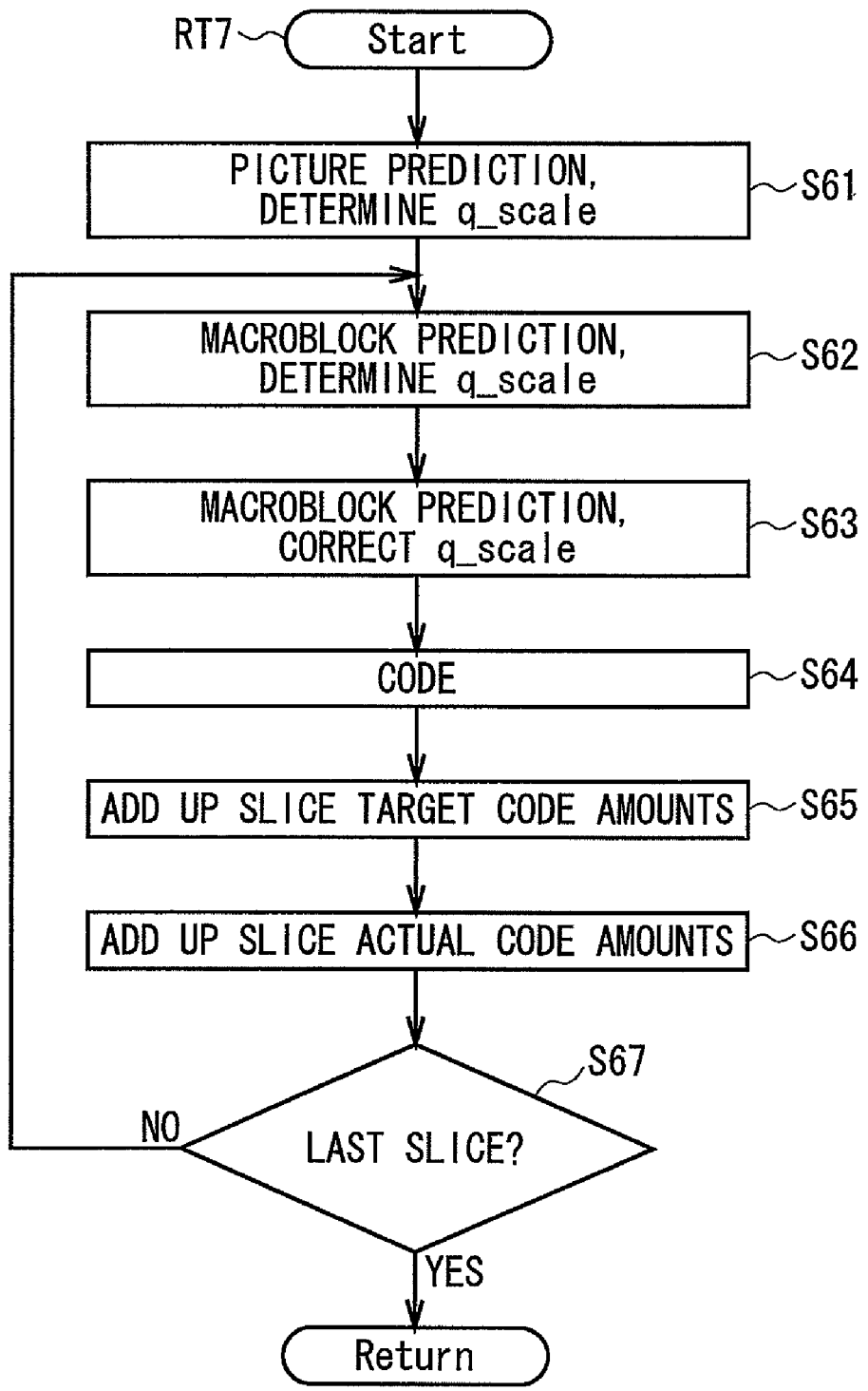
FIG. 13 is a flowchart showing the details of the picture coding by the coding apparatus according to the third embodiment of the present invention.

Next, in the processing shown in FIG. 13, the statistic amount calculation section 65 determines (step S61) a quantizer scale Q (q_scale_target) close to the picture target amount as in the first embodiment by using the statistic data VirBit which is the relationship information. By adaptive quantization based on the average quantizer scale Qa, the basic quantizer scale $Q_{MB}$ (q_scale$_{MB}$) of the macroblock is determined according to equation (5) (step S62). The MB generated code amount Target$_{MB}$ here is expressed by equation (6).

Now, if a single macroblock, which is a feedback unit, includes an edge boundary or other locations where 8×8 DCT blocks have significantly different characteristics, the characteristics of the groups of different characteristics can be accumulated. For such locations, macroblocks are not suitable grouping units.

In order to eliminate the effect of macroblock anomalies of deviating from the statistic curves, feedback control can be performed in units greater than macroblocks. The feedback control may be performed in such units as a single line to a single screenful of macroblocks as long as actual generated code amounts occurring actually fall within the allowable limits of error allowable in the system.

This feedback unit will hereinafter be referred to as a slice.

Each time actual coding is completed of a single slice, the actual MB generated code amounts genBit$_{MB}$ and the MB target code amounts Target$_{MB}$ are added up separately, whereby a slice actual generated code amount GenBitsslice, which is the actual generated code amount of each slice, and a slice target code amount Targetslice, which is the target code amount of each slice, are calculated (steps S65 and S66). Basic quantizer scales $Q_{MB}$ (q_scale) of all the macroblocks corresponding to the next slice are corrected by a modification value q_adj (step S65) for feedback control in units of slices.

$$\text{TargetBitsslice} = \Sigma \text{VirBit}[\text{mb\_mode}][\text{act\_q\_scale}][\text{byte\_group}] \quad (11)$$

$$\text{GenBitsslice} = \Sigma \text{GenBits}_{MB} \quad (12)$$

Here, TargetBitsslice is the sum of the MB target code amounts Target$_{MB}$ of the slice, and GenBitsslice is the actual MB generated code amount of the slice.

$$q\_adj = (\Sigma \text{GenBitsslice} - \Sigma \text{TargetBitsslice})/\Sigma \text{Deltaslice} \quad (13)$$

Here, the modification value q_adj is added to each of the basic quantizer scales (q_scale) in the next slice to be coded. Deltaslice is a boundary value equivalent to a single amount of change of the basic quantizer scale $Q_{MB}$ (q_scale), and $\Sigma$ represents a sum from the top slice.

That is, if the modification value q_adj is set to be too high, the modified quantizer scales $QS_{MB}$ (q_scale_adj) can be so greatly modified from the basic quantizer scales $Q_{MB}$ as to diverge. For this reason, the difference in the amount of code between the slice actual generated code amount GenBitsslice and the slice target code amount Targetslice, which is the target code amount of each slice, is divided by $\Sigma$Deltaslice to adjust the modification value q_adj into an appropriate value.

After the correction with the modification value q_adj to the next slice, the modified quantizer scales $QS_{MB}$ (q_scale_adj) can be expressed as "q_scale+q_adj," i.e., the modified value q_adj with respect to the basic quantizer scales $Q_{MB}$. Then, actual coding is performed by using these modified quantizer scales $QS_{MB}$ (q_scale_adj) (step S64). The above processing is repeated up to the last slice (step S67). When the processing is done up to the last slice, the processing returns.

(3-2) Procedure of Coding Processing

Next, coding processing procedures to be executed according to a coding program will be described with reference to the flowcharts of FIGS. 12 and 13. Note that the flowchart of FIG. 12 shows the code amount prediction processing to be performed at step S22 of the coding processing procedure RT3 (FIG. 8). The flowchart of FIG. 13 shows the actual coding processing to be performed at step S23 of the coding processing procedure RT3 (FIG. 8).

At step S22, the coding apparatus proceeds to step S51 of a code amount prediction processing procedure RT6 (FIG. 12) where the image data is coded with a fixed quantizer scale QI, in order to collect generated code amounts by using the precoder 60.

At step S51, the precoder 60 applies DCT processing to the input data by using the DCT section 62. The precoder 60 also quantizes the DCT-transformed image data (DCT coefficient data) on the fixed quantizer scale QI, thereby generating temporary quantized data. The precoder 60 further performs variable length coding on the temporary quantized data by using the variable length code amount calculation section 64, thereby generating a coded stream as temporary quantized data. The precoder 60 then proceeds to the next step S53.

At step S53, the precoder 60 temporarily stores the MB generated code amount $GenBits_{MB}$ of each macroblock of the coded stream into the statistics calculation unit, and proceeds to the next step S54.

At step S54, the precoder 60 determines whether or not the macroblock to be processed by the statistic amount calculation section 31 is the last macroblock of the current picture. If the result is negative, the precoder 60 returns to step S52 to continue the code amount prediction processing.

On the other hand, if the result at step S54 is positive, which indicates that the code amount prediction processing is to be performed on the next picture, then the precoder 60 returns to step S22 of the coding processing procedure RT3 (FIG. 8) and proceeds to the next step S23.

At step S23, the coding apparatus proceeds to step S61 of an actual coding processing procedure RT7 (FIG. 13) where the image data (DCT coefficient data) is coded while rate control is performed based on the MB generated code amounts $GenBits_{MB}$ calculated at step S22.

At step S61, the rate control section 70 of the coding apparatus calculates an average quantizer scale Qa to be determined on a picture-by-picture basis, by using the quantization index prediction section 71 based on the MB generated code amounts $GenBits_{MB}$ calculated at step S22. The rate control section 70 then proceeds to the next step S62.

At step S62, the rate control section 70 increases/decreases the activity-based offset λ based on the average quantizer scale Qa by using the quantization index prediction section 71, thereby predicting basic quantizer scales Q. The rate control section 70 then proceeds to the next step S63.

At step S63, the rate control section 70 determines modified quantizer scales $QS_{MB}$, which are the basic quantizer scales $Q_{MB}$ modified in accordance with the modification value q_adj, based on the basic quantizer scales $Q_{MB}$ and according to equation (13) by using the quantization index correction section 72. The rate control section 70 then proceeds to the next step S64.

At step S64, the parameter encoder 80 quantizer the image data based on the modified quantizer scales $QS_{MB}$ by using the quantization section 81, thereby generating quantized data. The parameter encoder 80 also performs variable length coding on the quantized data by using the variable length coding section 82, thereby generating a coded stream which is temporary quantized data. The parameter encoder 80 temporarily stores this coded stream into the buffer 83, and proceeds to the next step S65.

At step S65, the rate control unit 70 adds up the MB target code amounts $Target_{MB}$ according to equation (14) by using the target bit amount summation section 73, thereby calculating the slice target code amount Targetslice. The rate control section 70 then proceeds to the next step 66.

At step S66, the rate control section 70 adds up the MB generated code amounts $GenBit_{MB}$ according to equation (12) by using the generated bit amount summation section 74, thereby calculating the slice generated code amount TargetoBitslice. Here, the rate control section 70 calculates the modification value q_adj according to equation (13) based on the slice target code amount Targetslice and the slice target code amount Targetslice, and proceeds to the next step S67.

At step S67, the rate control section 40 determines whether or not the slice to be processed is the last slice. If the result is negative, the rate control section 40 returns to step S62 to continue the actual coding processing.

On the other hand, if the result at step S67 is positive, which indicates that the processing is to be performed on the next picture, then the coding apparatus returns to step S23 of the coding processing procedure RT3 (FIG. 8) and proceeds to the next step S24.

(3-3) Operation and Effect

With the foregoing configuration, the coding apparatus sets a slice target code amount Targetslice on a slice-by-slice basis, and performs feedback control based on the difference between this slice target code amount Targetslice and the slide actual generated code amount GenBitsslice which is the actual generated code amount of each slice.

As a result, the coding apparatus can perform feedback control in appropriate feedback units even in such cases that a single macroblock includes an edge boundary, two different types of images being present.

Fourth Embodiment (4-1) Overview

As has been described above, in proposed MPEG-2 test model TM5 and the like, code amount control is effected by means of feedback control using the relationship between the remaining level of a virtual buffer, quantizer index used in previous encoding, and MB generated code amounts.

According to the foregoing still-image based conventional art, however, it is necessary to calculate code amounts and make predictions with different quantizer scale a plurality of times in order to find out an average quantizer scale that is close to the target code amount and provides uniformity across the entire screen. This increases the cost pertaining to the circuits for calculation.

In a code amount control of feedback type, typified by TM5 mentioned above, it is impossible to provide a quantizer scale that produces appropriate code amounts whenever switching to a different sequence. This causes greater, visually more noticeable distortions in lower areas than in upper areas of the screen, and generates excessive amounts of code when entering a sequence, requiring code amount suppression with noticeable deterioration in image quality.

Such problems can sometimes be solved by acquiring the amounts of generation in previous quantization with certain values. As has been described in the first embodiment, in MPEG-2, or MPEG-2 Intra in particular, DCT coefficients decrease in value from lower to higher frequencies. This always holds for natural images. The code amounts of the macroblocks MB and the coefficient distribution therefore have a high correlation therebetween, and predictions can be made from the code amounts alone.

In MPEG-4 Part 10: AVC (Advanced Video Coding), hereinafter referred to as AVC standard), however, intra MB also includes intra-frame prediction (input picture minus I-pred picture/MC picture, i.e., differential picture) and the like. The DCT coefficient distribution is not the same as with MPEG-2 unless the foregoing relationship holds. For this reason, it is sometimes impossible to estimate the MB generated code amounts accurately even by using the same method as when supporting MPEG-2.

It is therefore a purpose of the present invention to allow the prediction of ideal code amount allocation per picture, realize CBR (constant bit rate) code amount control for use in a VTR system and the like at low cost, and eliminate temporally imbalanced distortions and the like ascribable to overuse of code amounts upon a sequence change, which is problematic in TM5 and other code amount controls of feedback type.

(4-2) Configuration of Coding Apparatus

Figure 14:
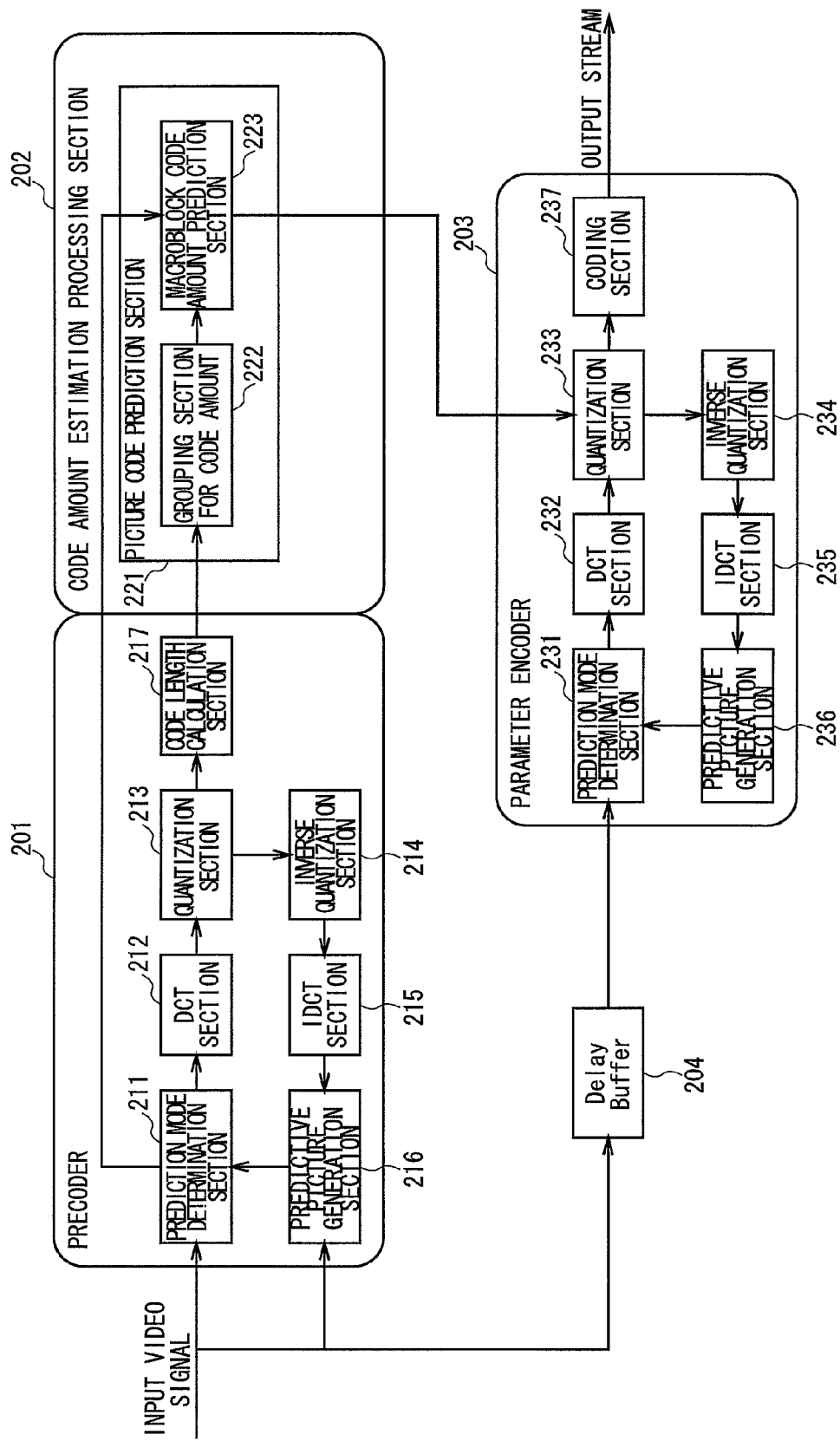
FIG. 14 is a block diagram of a coding apparatus according to a fourth embodiment of the present invention.

FIG. 14 shows the configuration of a coding apparatus according to an embodiment of the present invention, which will now be described.

This coding apparatus supports the AVC standard, and employs a 2 Pass Encode-scheme.

The original objective of the 2 Pass Encode scheme is to estimate MB generated code amounts at coding time accurately, and perform allocation of code amounts within pictures and allocation of code amounts between pictures so as to achieve high image quality. This embodiment is characterized by predicting the MB generated code amounts when coding with a certain quantization value, which is one of the elemental technologies of the scheme.

As shown in this FIG. 14, the coding apparatus includes a precoder 201, a parameter encoder 203, a code amount estimation processing section 202, and a delay buffer 204. The precoder 201 includes a prediction mode determination section 211, a DCT (Discrete Cosine Transform) section 212, a quantization section 213, an inverse quantization section 214, an IDCT (Inverse Discrete Cosine Transform) section 215, a predictive picture generation section 216, and a code length calculation section 217. The code amount estimation processing section 202 includes a picture code amount prediction section 221, a grouping section 222 for code amount, and a macroblock code amount prediction section 223. The parameter encoder 203 includes a predictive picture selection section 231, a DCT section 232, a quantization section 233, an inverse quantization section 234, an IDCT section 235, a predictive picture generation section 236, and a coding section 237.

Under the foregoing configuration, the basic 2 Pass Encode control includes: performing encoding for acquiring information, called Pre-Encoding, using a single quantization parameter QP selected; and predicting MB generated code amounts for situations where encoding is performed with other unselected quantization parameters QP, based on the information acquired and statistics created in advance. That is, the precoder 1 performs pre-encoding, and the parameter encoder 203 performs actual encoding. It should be appreciated that the precoder 1 corresponds to temporary coding means, for example. The parameter encoder 203 corresponds to actual coding means, for example. The code amount estimation processing section 202 corresponds to the code amount estimation section, for example. This is not restrictive, however. Pictures shall be Intra pictures (intra-frame predicted differential pictures).

In the pre-encoding of the precoder 1, all macroblocks are coded with a fixed quantization parameter QP (hereinafter, this will be referred to as fixed quantization parameter QPI; for example, QPI=16). The coding processing itself is performed by context-adaptive variable length coding (CAVLC). That is, even if actual encoding is performed by CABAC (Context-Adaptive Binary Arithmetic Coding), the pre-encoding employs CAVLC coding.

The reason for using CAVLC is that its processing is simpler than that of CABAC. CABAC processing can be too time-consuming since the binarization can produce excessive amounts of code on hardware in particular. CABAC is arithmetic coding, and CAVLC is variable-length coding, i.e., of different coding system. The CAVLC coding is also intended to suppress the circuit scale.

In general, variable length coding codes information of certain areas efficiently. Arithmetic coding is capable of efficient coding regardless of areas.

Due to this characteristic, large errors can naturally occur depending on information output if the MB generated code amounts in arithmetic coding are predicted based on variable length coding. CAVLC can switch contexts adaptively, however, and is thus capable of efficient coding with not much area limitations as compared to typical variable length coding. Consequently, CABAC-based MB generated code amounts can be estimated even from CAVLC-coded MB generated code amounts, not to say without errors. In other respects, ME (Motion Estimation) and MB Mode determination processing are performed almost the same manner as in the actual encoding.

The actual encoding (parameter encoder 203), but not the pre-encoding (precoder 201), includes processing of increasing/decreasing the quantization parameters QP according to image characteristics, or so-called activity processing. For example, quantization parameters QP are decreased for macroblocks where image deterioration is noticeable, and quantization parameters QP are increased where image deterioration is less noticeable. To increase the estimation accuracy of the actual encoding, this adjusting value is also calculated at the time of pre-encoding, and the information is output on a macroblock-by-macroblock basis.

Among other information to be output during pre-encoding is the MB generated code amount of DCT coefficients in each macroblock, the MB generated code amount of a header, and the number of non-zero coefficients. Incidentally, the MB generated code amount of the DCT coefficients in each macroblock and the MB generated code amount of the header are output separately.

In addition to this, values called "Coef Cost" are calculated for a coefficient of each MB, and the total sum thereof is also output for accurate estimation. As will be described later, in this embodiment, the MB generated code amounts of the macroblocks obtained from statistics are corrected based on this Coef Cost.

Here, Coef Cost means an index to an increase of the quantization parameter QP that makes the coefficient zero. In other words, Coef Cost is a value that indicates how much for the quantization parameter QP to be increased to bring the coefficient down to zero. In this embodiment, Coef Cost is determined from the value of the coefficient. Coef Cost is 0 for a coefficient of 0, 1 for 1, 2 for 2, 3 for 3 and 4, 4 for 5 to 8, and 5 for 9 to 16, and is calculated by (coefficient value/16)+5 thereafter.

For small coefficients, importance is given to the number of bits since it is of greater significance that the coefficient becomes zero than the magnitude of the coefficient. For large coefficients, Coef Cost is incremented for every 16 in this embodiment in order to reflect information that the magnitude of the coefficient decreases gradually.

That is, for smaller quantization coefficients, Coef Cost is increased/decreased more with respect to an increase/decrease of the coefficients. For larger quantization coefficients, on the other hand, Coef Cost is increased/decreased less with respect to an increase/decrease of the coefficients.

Now, if considerably high accuracy is required to predict the MB generated code amounts, the histogram of these Coef Cost may be better output, though with an enormous amount of information.

If no such high accuracy is needed, on the other hand, the total sum of Coef Cost/the number of non-zero coefficients, i.e., information on per-coefficient Coef Cost can be used to increase the accuracy. In this embodiment, the total sum of Coef Cost is then output as the information. Since the number of non-zero coefficients is output in advance, the total sum allows the calculation.

Figure 15:
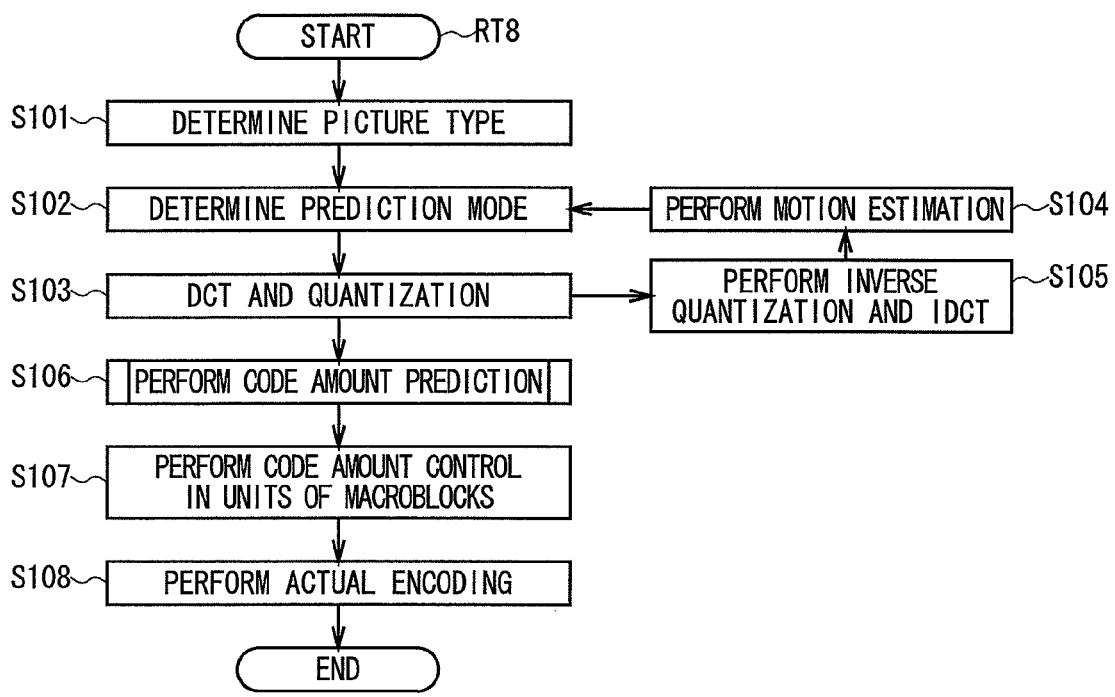
FIG. 15 is a flowchart detailing the coding processing of the coding apparatus according to the fourth embodiment of the present invention.

Hereinafter, the coding processing by the coding apparatus according to one embodiment of the present invention will be described in detail with reference to the flowchart of FIG. 15. It should be noted that all or part of the following processing also corresponds to the image coding method according to the first embodiment of the present invention.

In the prediction mode determination section 211, picture types are periodically assigned to an input video signal, like IBBPBBP..., based on N which determines the GOP (Group Of Pictures) period and an initial value M which determines the period of an I- or P-picture (step S1). Next, in the prediction mode determination section 211, the input video signal is received, and a macroblock type or prediction mode is determined based on the residual (SAD) from an MC picture determined by the predictive picture generation section 16, the distribution of macroblocks, etc. A predictive picture is transmitted to the DCT section 212 (step S2).

In the DCT section 212, the predictive picture is transformed into a frequency domain by a discrete cosine transform, and DCT coefficient data is transmitted to the quantization section 213. This quantization section 213 performs quantization processing using a quantization parameter QP (for example, QP=16) that is fixed to the DCT coefficient data (step S3).

In the inverse quantization section 214 and the IDCT section 215, a local decoded picture is generated based on the output of the quantization section 213 in order to obtain a predictive picture. That is, in the inverse quantization section 214, the quantized data supplied from the quantization section 213 is inversely quantized to reproduce the DCT coefficient data. In the IDCT section 215, this DCT coefficient data is subjected to an inverse discrete cosine transform to generate a decoded image locally. Based on this local decoded image, motion estimation is then performed by the predictive picture generation section 16 (steps S4 and S5).

Next, code amount prediction is performed by the picture code amount prediction section 221 of the code amount estimation processing section 202 (step S6). The details will be given later with reference to FIG. 16.

Here, in the macroblock code amount prediction section 223, the quantization parameter QP of the picture is converted into quantization parameters QP to be predicted for each macroblock (hereinafter, these will be referred to as basic quantization parameters $QP_{MB}$) and the intended target code amounts $Target_{MB}$ of the respective macroblocks, based on information that is grouped by the grouping section 222 for code amount and prediction curves (transition curves) that are determined statistically. The basic quantization parameters $QP_{MB}$ and the target code amounts $Target_{MB}$ are set into the parameter encoder 203 (step S7).

In the parameter encoder 203, actual MB generated code amounts are fed back while code amount control is performed based on the picture type determined by the precoder 201, macroblock prediction modes, motion vectors, and the basic quantization parameters $QP_{MB}$ and the target code amounts $Target_{MB}$ determined by the picture code amount prediction section 221, whereby parameter encoding is performed (step S8).

That is, the input video signal is input through delay processing by the delay buffer 4. In the predictive picture selection section 231, the prediction mode of a macroblock is set by the macroblock code amount prediction section 223, and a predictive picture is selected. In the DCT section 232, a DCT transform is performed and the DCT coefficient data is transmitted to the quantization section 233. In the quantization section 233, quantization is performed on this DCT coefficient data by using the basic quantization parameters $QP_{MB}$ determined by the macroblock code amount prediction section 223, and the quantized data is transmitted to the coding section 237. In this coding section 37, coding is performed and the coded stream is output as temporary quantized data. In the inverse quantization section 234, the IDCT section 235, and the predictive picture generation section 236, a local decoded picture is generated based on the output (quantized data) of the quantization section 233 in order to obtain a predictive picture. This completes the series of processing.

Next, with reference to the flowchart of FIG. 16, description will be given of the code amount prediction processing to be performed at step S6 of FIG. 15.

In the code amount prediction processing, picture generated code amounts are calculated for a situation where the GOP is quantized with a certain quantization parameter QP (step S111). This is performed by calculating the MB generated code amounts for situations when the pictures are quantized with the quantization parameter QP (step S112). Specifically, it is achieved by a macroblock-by-macroblock basis code amount prediction (step S113). The macroblock-by-macroblock basis code amount prediction will be detailed later with reference to FIG. 17.

That is, the MB generated code amounts of the respective macroblocks quantized with the certain quantization parameter QP are calculated and added up to calculate the picture generated code amount of each picture at the quantization parameter QP. The picture generated code amounts are further added up to calculate the GOP generated code amount of each GOP at the quantization parameter QP.

Thus, whether or not the GOP generated code amount falls within an intended GOP target code amount is determined (step S114). If not, the quantization parameter QP is changed to return to step S111, repeating the foregoing processing. If does, this processing is ended. It follows that the processing proceeds to step S7 and subsequent steps of FIG. 15.

Next, with reference to the flowchart of FIG. 17, description will be given in detail of the macroblock code amount prediction processing to be performed at step S113 of FIG. 16.

This embodiment is predicated on that statistics on the representative value of Coef Cost of a single coefficient are created for each MB Group. Statistics are also created on <the representative values of the code amounts of DCT coefficients generated by macroblocks> for each MB Group, for situations where the quantization parameter QP is "0 to 51." Statistics are also created on "<the representative values by which the MB generated code amounts vary> when the Coef Cost of a single coefficient deviates by 1 from <the representative value of Coef Cost of a single coefficient>" for each MB Group, for situations where the quantization parameter QP is "0 to 51." To acquire the MB generated code amount of a macroblock from the statistics, an adjusting value AddQp of the macroblock is reflected thereon. (→ Check for "0" or "1" later on)

Now, when predicting code amounts with a certain quantization parameter QP, macroblocks are initially grouped (step S121) based on the MB generated code amounts of the DCT coefficients of the macroblocks that are determined by the pre-encoding of the precoder 201.

In this embodiment, the MB generated code amount of the DCT coefficients, divided by 64, is used as a group number (hereinafter, MbGroupNo). When predicting MB generated code amounts, relationship tables (corresponding to the prediction curves in the first embodiment) that indicate the relationship between the quantization parameters QP and the MB generated code amounts, created as relationship information from the statistics, are used. The relationship tables can be expressed as VirBits[MbGroupNo][Qp], and are stored as prediction tables by each macroblock group number. Consequently, these relationship tables can be used to obtain the predicted values of MB generated code amounts at an intended quantization parameter QP.

In this embodiment, the relationship tables are prepared for Inter Slice/Intra Slice separately. The respective Inter Slice/Intra Slice relationship tables are referred to collectively as statistic tables, which can be expressed as VirBits[SliceType][MbGroup][Qp].

That is, prediction tables containing MB generated code amounts associated with each quantization parameter QP are established with respect to each of the group numbers of the macroblock groups, thereby creating relationship tables. The relationship tables are established with respect to each of the picture types (i.e., prediction modes) of the slices, thereby establishing statistic tables. These statistic tables are stored in a not-shown ROM or the like.

Next, a single picture predicts MB generated code amounts at one certain basic quantization parameter QP (TargetQp). Here, the quantization parameter QP is increased/decreased for each macroblock according to the image characteristics (step S122). That is, the adjusting value AddQp of the quantization parameter QP is added according to the characteristics of the image at the pre-encoding time. The picture generated code amount of a single picture on which the adjusting values AddQp are reflected is expressed by the following formula (step S123):

$$\text{Sum}(\text{VirBits}[\text{SliceType}][\text{MbGroup}][\text{TaretQp+AddQp}]) \quad (14)$$

That is, the picture generated code amount at the quantization parameter QP to make a prediction at (TargetQp) is a value that is determined by adding up the generated code amounts associated with the picture type, the macroblock group numbers, and the quantization parameters QP (TargetQp+AddQp), which are the quantization parameter QP to make a prediction at with the adjusting values AddQp reflected thereon, for each picture.

Besides, since the number of MB generated code amounts obtained from the tables is one for each group, the prediction accuracy can improve if differences between the MB generated code amounts within the group are reflected. Then, if the MB generated code amounts determined by the pre-encoding and VirBits[SliceType][MbGroup][quantization parameter QP at Pre-Encoding time] have a difference (DiffBits) therebetween, the difference is added to all the quantization parameters QP (step S24). This is expressed by the following equation:

$$\text{DiffBits} = MB \text{ generated code amount at Pre-Encoding time} - \text{VirBits}[\text{SliceType}][MbGroup][\text{quantization parameter QP at Pre-Encoding time}] \quad (15)$$

That is, when predicting the MB generated code amount of macroblock at a quantization parameter QP, a difference value is determined between the amount of code actually generated by pre encoding the macroblock and <the representative value of the code amount of the DCT coefficients generated by MB> of the quantization parameter QP in that MB Group. This difference value is then added as a fixed correction value DiffBits. This fixed correction value is conceptually shown in FIG. 18.

Figure 18:
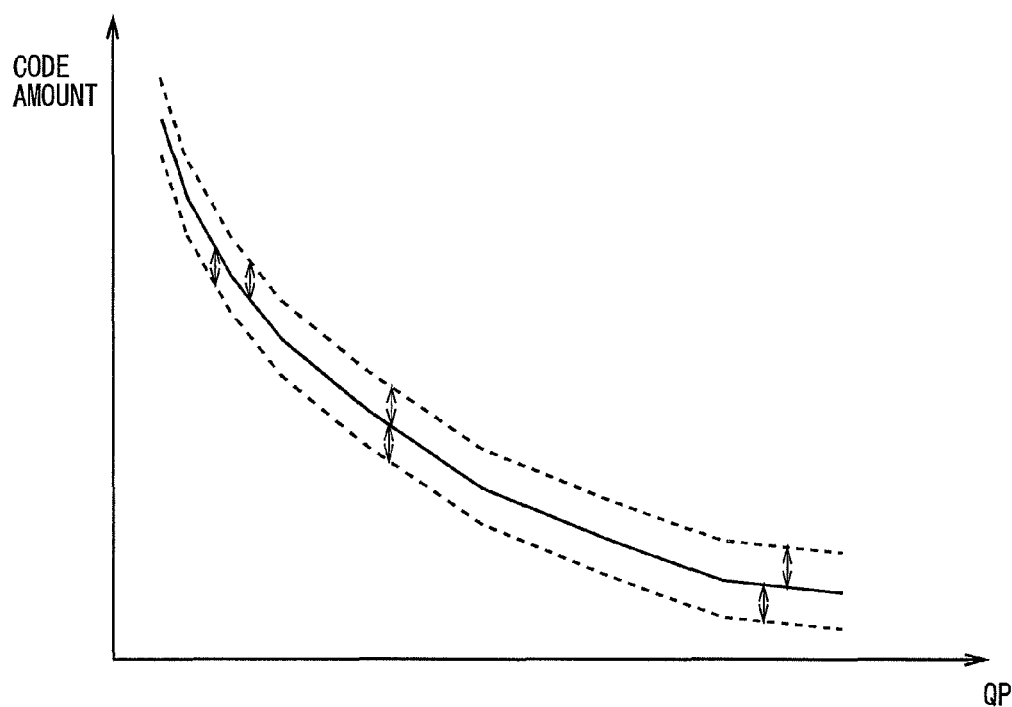
FIG. 18 is a diagram conceptually showing a fixed correction value.

That is, in FIG. 18, the vertical axis indicates the code amount and the horizontal axis indicates the quantization parameter QP. The solid line indicates statistic values, and the broken lines indicate values off the statistics. From the chart, if macroblocks in similar situations have a difference (shown by an arrow) in the MB generated code amount at one quantization parameter QP, they show somewhat similar differences at any quantization parameter QP. In view of this, this fixed correction value DiffBits is reflected as the difference of the MB generated code amounts within the group.

In other words, by using the difference value as the fixed correction value DiffBits, the prediction curve shown by the statistics is moved in parallel for use.

Next, a difference is determined between Coef Cost at pre-encoding time and Coef Cost of the statistics of the same group (step S125). The reason therefor will be described below.

When the quantization parameter QP changes, all MBs do not make a similar decrease or increase even if the MBs belong to an identical group at the time of pre-encoding. Some macroblocks decrease in the MB generated code amount quickly, and some macroblocks decrease in the MB generated code amount not so quickly. Such differences are not visible in the statistics of the MB generated code amounts alone, and the MBs can more or less produce errors. Each individual error is not so high, but a single picture of accumulation can be some error. To correct those errors, the information of per-coefficient Coef Cost is used in this step.

This Coef Cost is calculated from the magnitudes of the coefficients. Lower values indicate that more coefficients become zero coefficients even if the quantization parameter QP increases slightly. Higher values, on the other hand, indicate that fewer coefficients become zero coefficients even if the quantization parameter QP makes some increase. In AVC-based coding, this value is used for error correction since the MB generated code amounts tend to decrease significantly with the increasing number of zero coefficients.

Figure 19:
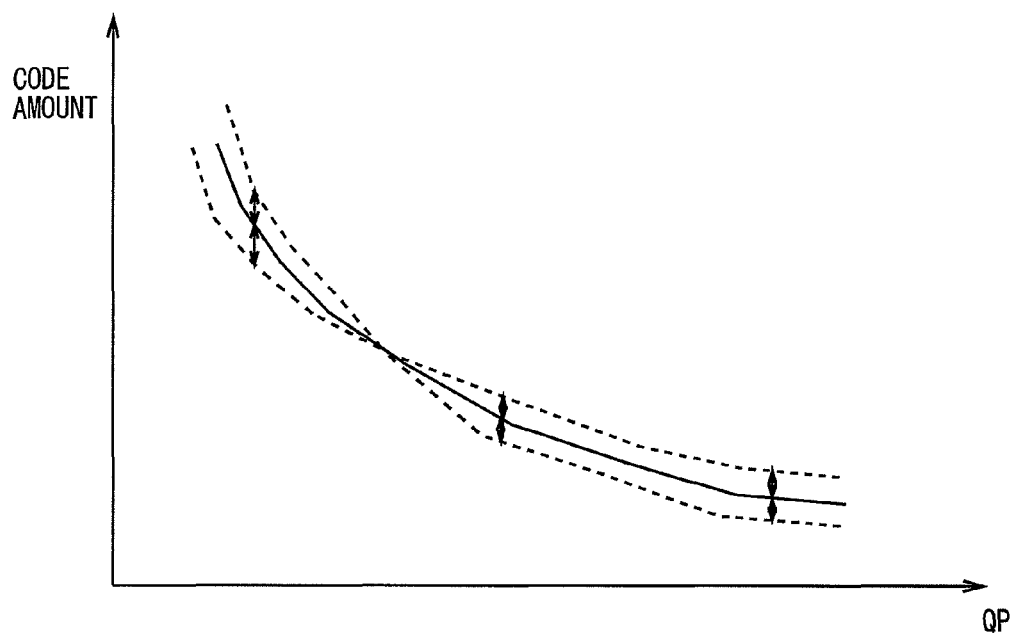
FIG. 19 is a diagram conceptually showing a variable correction value.

The variable correction value is conceptually shown in FIG. 19.

That is, in FIG. 19, the vertical axis indicates the code amount and the horizontal axis indicates the quantization parameter QP. The solid line indicates statistic values, and the broken lines indicate values off the statistics. When per-coefficient Coef Cost (Coef Cost/the number of non-zero coefficients) is low, it means that the macroblock has a lot of small coefficients. The number of zero coefficients tends to increase quickly (high decreasing rate) when the quantization parameter QP is increased. When per-coefficient Coef Cost is high, on the other hand, it means that the macroblock has a lot of large coefficients. The number of zeros tends to increase less (low decreasing rate) even if the quantization parameter QP is increased. Then, a variable correction value CorrectBits is determined from per-coefficient Coef Cost and the ratio of the number of bits generated, and is used for correction.

In other words, the prediction curve shown by the statistics is used as modified in gradient by the variable correction value CorrectBits, around the MB generated code amount at the fixed quantization parameter QPI with which the MB generated code amount is actually calculated.

Specifically, for error correction, per-coefficient Coef Cost of the macroblock is initially calculated from the amount of deviation CostDiff from per-coefficient Ceof Cost of the group created from the statistics. This is expressed by the following equation:

$$\text{CostDiff} = \text{per-coefficient Coef Cost} - \text{Coef Cost}[MbGroup] \quad (16)$$

Next, a correction value to the difference of Coef Cost is calculated from the statistics, and the MB generated code amount is determined (step S26). Here, an adjustment table determined from the statistics, indicating how much the MB generated code amount increases/decreases for a change of 1 in per-coefficient Coef Cost, is consulted to determine the variable correction amount CorrectBits by the following equation:

$$\text{CorrectBits} = \text{RatioCostBits}[\text{SliceType}][MbGroupNo][\text{Target}Qp + \text{Add}Qp] * \text{CostDiff} \quad (17)$$

That is, in this step, the MB generated code amount of a macroblock at a quantization parameter. QP is predicted. Here, if a value of Coef Cost of a single coefficient of the macroblock and the representative value of Coef Cost of a single coefficient of the MB Group have therebetween, then the MB, generated code amount to be corrected is calculated based on the difference and "<the representative value by which the MB generated code amount varies> (hereinafter, this will be referred to as correction coefficient RationCost-Bit) when Coef Cost of a single coefficient deviates by 1 from <the representative value of Coef Cost of a single coefficient>."

That is, the MB generated code amount is calculated by multiplying the correction coefficient RationCostBit, which is selected based on the picture type of the slice, the macro group number, and the quantization parameter QP with the adjusting value AddQP reflected thereon (TargetQp+AddQp), by the amount of deviation CostDiff.

In consequence, the picture generated code amount of a single picture is given by the following formula:

$$\text{Sum}(\text{VirBits}[\text{SliceType}][\text{MbGroup}][\text{TaretQp+AddQp}]+\text{DiffBits}+\text{CorrectBits}) \quad (18)$$

Figure 16:
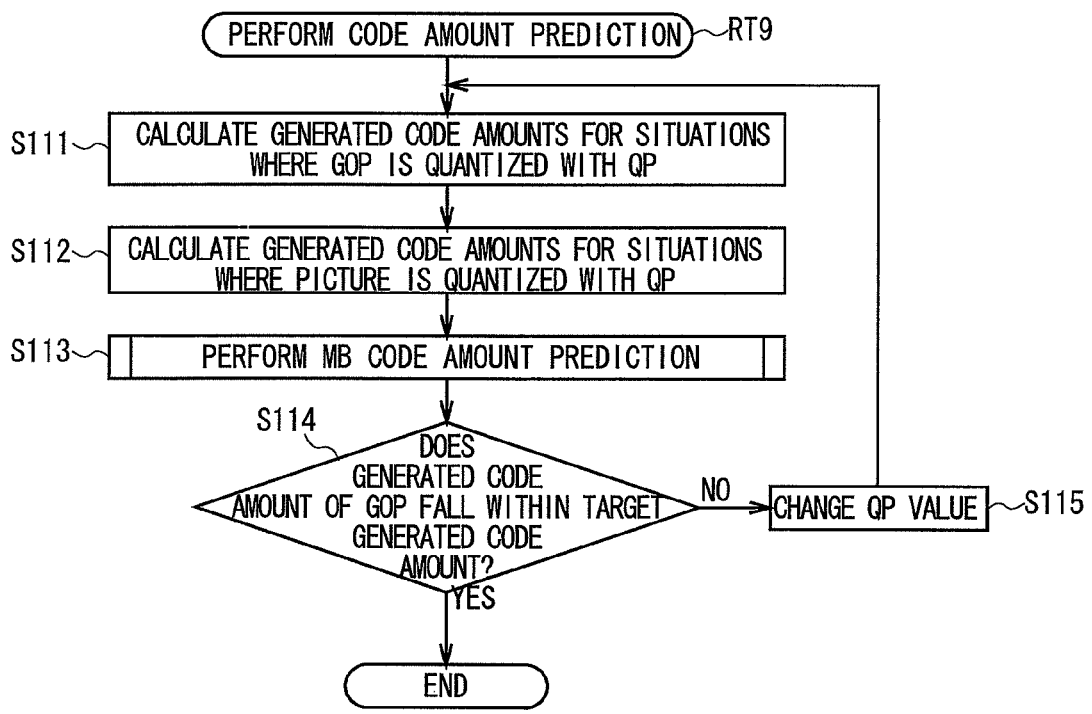
FIG. 16 is a flowchart explaining code amount prediction processing according to the fourth embodiment of the present invention.
Figure 17:
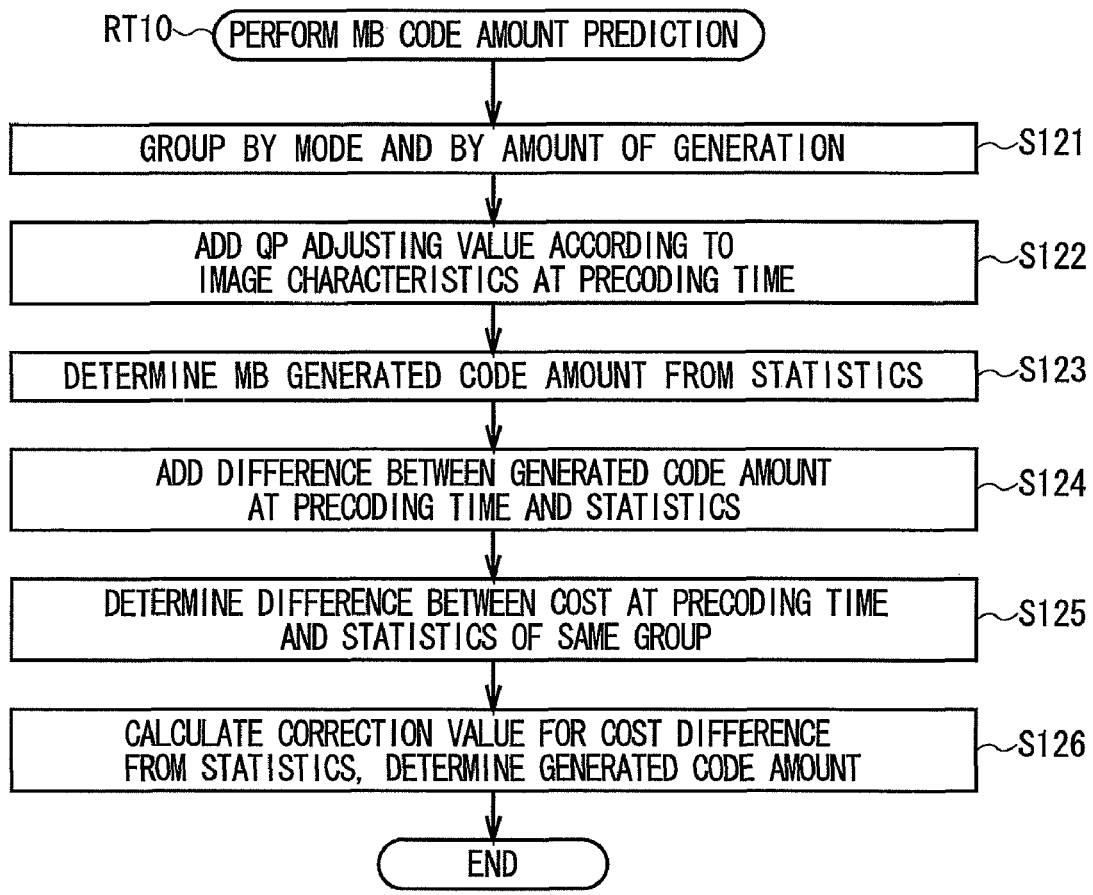
FIG. 17 is a flowchart explaining MB's code amount prediction processing according to the fourth embodiment of the present invention.

The macroblock code amount prediction is thus completed, and the processing proceeds to step S114 and the subsequent step of FIG. 16.

In this embodiment, the correction has been performed by using the information of per-coefficient Coef Cost. It is then necessary to calculate the information of Coef Cost. It is understood that if reduced processing is required, per-coefficient Coef Cost may be replaced with a per-coefficient generated code amount, though with some decrease in the prediction accuracy. In this case, the statistics to be created are on the representative value of the generated code amount of a single coefficient and "<the representative value by which the generated code amount varies when the generated code amount of a single coefficient deviates by 1 from <the representative value of the generated code amount of a single coefficient>."

Now, the generated code amounts of header parts of macroblocks are performed on a picture-by-picture basis. The generated code amounts are not changed if the quantization parameter QP falls within 0 to 26, and are set to certain fixed bits (A bits) per 1 MB if 40 to 51. If the generated code amount of MB Header during pre encoding averages A bits or above per 1 MB and the quantization parameter QP falls within 27 to 39, the generated code amount is determined by linear interpolation so as to be A bits per 1 MB when the quantization parameter QP is 40.

Here, the fixed quantization parameter QPI is assumed to be set to a quantization parameter QP that is likely to be used for parameter encoding (for example, a value of "10 to 20" or so). Here, utilizing the characteristic that the MB generated code amount of a header part will not vary greatly even if the quantization parameter QP increases/decreases, the coding apparatus simply predicts the MB generated code amount at a quantization parameter QPI other than the fixed quantization parameter QPI to be the MB generated code amount at the fixed quantization parameter QPI if the quantization parameter QP is close to the fixed quantization parameter QPI, or "0 to 26."

Moreover, utilizing the characteristic that the MB generated code amount of the header part varies little if the quantization parameter QPI exceeds a certain value, the coding apparatus predicts the MB generated code amount at a quantization parameter QPI other than the fixed quantization parameter QPI to be the fixed value "A" bit if the quantization parameter QP is higher than or equal to "40."

Then, if the quantization parameter QPI is "27 to 39," the coding apparatus predicts the MB generated code amount by linear interpolation such that the MB generated code amount at the quantization parameter QP of "40" is the fixed value "A", and the MB generated code amount at "26" is the MB generated code amount at the fixed quantization parameter QPI.

This makes it possible for the coding apparatus to predict the MB generated code amounts of header parts by simple processing accurately, utilizing the characteristics of the header parts.

The coding apparatus is then configured to set MB target code amounts $\text{Target}_{MB}$ and basic quantization parameters $\text{QP}_{MB}$ as in any of the first to third embodiments, and perform the foregoing rate control.

As has been detailed above, according to one embodiment of the present invention, it is possible to determine the predicted values of basic quantization parameters $\text{QP}_{MB}$ and MB target code amounts $\text{Target}_{MB}$ in units of MB with high accuracy. The feedback during actual encoding is precautionary processing for code amount control. It is therefore possible to predict ideal allocation of code amounts per picture, and achieve CBR code amount control for use in a VTR system and the like at low Cost. It is also possible to eliminate temporally imbalanced distortions and the like ascribable to overuse of code amounts upon a sequence change, which is problematic in TM5 and other code amount controls of feedback type. This leads to improved image quality. It is also possible to perform rate allocation on a macroblock-by-macroblock basis more accurately irrespective of the image content of the picture, with an improvement in image quality. Consequently, some images can be prevented from macroblock skips in lower areas of the screen ascribable to insufficient amounts of code.

(4-3) Procedure of Coding Processing

Now, MB code amount prediction processing to be executed according to a coding program will be described with reference to the flowchart of FIG. 17.

When a coded stream (temporary quantized data) based on quantized data quantized with a fixed quantization parameter QP is supplied, the picture code amount prediction section 221 of the coding apparatus groups each macroblock of the coded stream by using the grouping section 222 for code amount, based on the generated code amount $\text{GenBit}_{MB}$ and the picture type of the respective macroblocks. The picture code amount prediction section 221 then proceeds to the next step S122.

At step S222, the picture code amount prediction section 221 adds an adjusting value AddQP to the quantization parameter QP to make a prediction at by using the macroblock code amount prediction section 223, according to the characteristics of the image calculated at the time of precoding of the precoder 201. The picture code amount prediction section 221 thereby calculates an adaptive quantization parameter QPt, and proceeds to the next step S123.

At step S123, the picture code amount prediction section 221 selects one relationship table from among the statistic tables based on the picture type of the macroblock by using the macroblock code amount prediction section 223. The picture code amount prediction section 221 also selects one prediction table based on the group into which the macroblock is classified, and reads the MB generated code amount of the macroblock at the adaptive quantization parameter QPt. The picture code amount prediction section 221 then proceeds to the next step S124.

At step S124, the picture code amount prediction section 221 calculates the difference value DiffBits between the MB generated code amount $GenBit_{MB}$ at precoding time and the generated code amount for the fixed quantization parameter QP in the selected prediction table, according to equation (15) by using the macroblock code amount prediction section 223. The picture code amount prediction section 221 then proceeds to the next step S125.

At step S125, the picture code amount prediction section 221 divides the total sum of Coef Cost of each macroblock by the number of non-zero coefficients (i.e., the number of coefficients that are not zero) by using the macroblock code amount prediction section 223, thereby calculating per-coefficient Coef Cost. The macroblock code amount prediction section 223 also calculates the difference value CostDiff between per-coefficient Coef Cost of the macroblock calculated at precoding time and per-coefficient Coef Cost of the group to which the macroblock is classified, calculated with the fixed quantization parameter QP, according to equation (16). The macroblock code amount prediction section 223 then proceeds to the next step S126.

At step S126, the picture code amount prediction section 221 selects a corresponding correction coefficient RatioCostBit by using the macroblock code amount prediction section 223, from among pieces of correction information that are stored by picture type, by group, and by value of the adaptive quantization parameter QPt. The macroblock code amount prediction section 223 also calculates the correction value CorrectBits according to equation (17) by multiplying this correction coefficient selected and the difference value CostDiff calculated at step S125.

Then, the macroblock code amount prediction section 223 predicts the MB generated code amount at the adaptive quantization parameter QPt according to formula (18) by adding the difference value DiffBits calculated at step S124 and the correction value CorrectBits to the MB generated code amount at the adaptive quantization parameter QPt that read at step S124. The macroblock code amount prediction section 223 then proceeds to the end step to end the processing, and returns to step S133 of the code amount prediction processing procedure RT9.

(4-4) Decoding Apparatus

Figure 20:
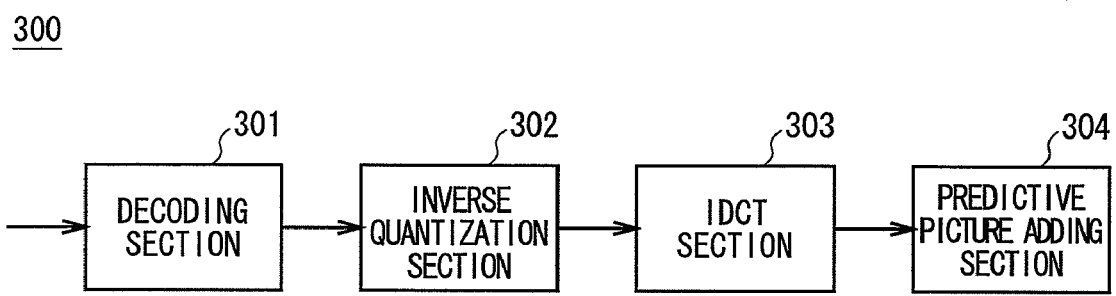
FIG. 20 is a diagram showing the configuration of a decoding apparatus.

Now, the configuration of a decoding apparatus 300 for decoding an actual coded stream that is coded as above will be described with reference to FIG. 20.

When the actual coded stream is supplied, the decoding apparatus 300 performs the decoding of the actual coded stream by using setting information that is set in the actual coded stream. Specifically, the decoding apparatus 300 supplies the actual coded stream to a decoding section 301. The decoding section 301 decodes the actual coded stream to generate quantized data, and supplies the quantized data to an inverse quantization section 302.

The inverse quantization section 302 inversely quantizes the quantized data by using quantization parameters QP set in the setting information, thereby restoring image data consisting of DCT coefficients, and supplies this image data to an IDCT section 303. The IDCT section 303 applies IDCT processing to the image data, and supplies differential image data SAD to a predictive picture adding section 304.

The predictive picture adding section 304 is configured to add predicted values predicted through inverse intra prediction processing and motion estimation processing to the differential image data SAD, thereby generating a video output signal that shows an image, and output this video output signal to a not-shown external device or the like.

(4-5) Operation and Effect

With the foregoing configuration, the coding apparatus uses a coded stream that is coded by a coding scheme where macroblock generated code amounts do not vary greatly depending on areas after the quantization of image data, as temporary quantized data. The coding apparatus also uses prediction tables as the quantized data for prediction, and corrects the MB generated code amounts at quantizer steps that are based on quantization parameters QP other than a fixed quantization parameter QPI in the prediction tables (i.e., unselected quantizer steps) with a variable correction value CorrectBits, thereby predicting the MB generated code amounts for situations where DCT coefficient data as the image data is quantized with the unselected quantizer steps.

Consequently, the coding apparatus can predict the MB generated code amounts at the quantization parameters QP other than the fixed quantization parameter QPI based on the MB generated code amounts that are calculated by using the selected fixed quantization parameter QP even in such cases that the quantized data is coded by a coding scheme where the macroblock generated code amounts do not vary greatly depending on areas.

Moreover, the coding apparatus applies a predetermined orthogonal transformation processing of DCT processing to image data, thereby generating DCT coefficient data (coefficients of transformation) as image data. Based on this DCT coefficient data, the coding apparatus selects a variable correction value CorrectBits for correcting the macroblock generated code amounts at the quantizer steps that result from the quantization parameters QP other than the fixed quantization parameter QPI on the prediction curves (i.e., unselected quantizer steps).

Furthermore, the coding apparatus calculates the total sum of Coef Costs in each macroblock as an index total of Coef Costs which are index values calculated according to quantization parameters QP based on zero quantizer steps that are necessary to bring the DCT coefficients to zero. Based on the total sum of Coef Costs, the coding apparatus determines the variable correction value CorrectBits as a correction value for correcting the MB generated code amounts.

Consequently, the coding apparatus can correct the MB generated code amounts appropriately since the variable correction value CorrectBits can be determined based on Coef Costs which have a large impact on the MB generated code amounts. Using the total sum of Coef Costs, the coding apparatus can also reduce the amount of information of variable correction values CorrectBits to be stored and the processing load thereof as compared to when using all the Coef Cost values.

Moreover, the coding apparatus calculates Coef Costs so that Coef Costs increase/decrease greatly with respect to quantization parameters QP that are based on zero quantizer steps of small values.

Consequently, the coding apparatus can increase/decrease Coef Costs greatly for DCT coefficients that are likely to become "0" with increasing quantization parameters QP, and thus can directly reflect the magnitudes of variations of the MB generated code amounts upon Coef Costs.

Furthermore, the coding apparatus determines the variable correction value CorrectBits based on per-coefficient Coef Cost, which is Coef Cost per number of non-zero coefficients or DCT coefficients that are not zero.

Consequently, the coding apparatus can improve the accuracy of prediction of the MB generated code amounts on a correction basis since it can use the number of non-zero coefficients having a high impact on the MB generated code amounts as a factor for determining the variable correction value CorrectBits.

The coding apparatus also determines the variable correction value CorrectBits based on Coef Cost per number of non-zero coefficients or DCT coefficients that are not zero, and the quantizer steps resulting from the quantization parameters QP other that the fixed quantization parameter QPI for the MB generated code amounts to be predicted at (i.e., unselected quantizer steps).

Consequently, the coding apparatus can improve the accuracy of prediction of the MB generated code amounts on a correction basis since it can determine the variable correction value CorrectBits according to the differences between the fixed quantization parameter QPI and the quantization parameters QP other than the fixed quantization parameter QPI (i.e., differences between the selected quantizer step and the unselected quantizer steps).

The coding apparatus also determines the variable correction value CorrectBits for correcting the MB generated code amounts at quantizer steps other than the fixed quantization parameter QPI in the selected prediction table according to the MB generated code amounts of the coded stream that is the temporary quantized data.

Moreover, the coding apparatus calculates the fixed correction value DiffBits from the MB generated code amount at the selected quantizer step in a prediction table (the quantizer step based on the fixed quantization parameter QPI), as a difference value of the MB generated code amount of the quantized data for prediction shown by the prediction table at the selected quantizer step. The coding apparatus then predicts the MB generated code amounts for the unselected quantizer steps by adding the fixed correction value DiffBits to the MB generated code amounts shown by the prediction table according to at the unselected quantization parameters QP (i.e., other than the fixed quantization parameter QPI.

Consequently, the coding apparatus can improve the accuracy of prediction of the MB generated code amounts since errors occurring at the time of grouping into the prediction quantized data can be corrected by the fixed correction value DiffBits.

Furthermore, the coding apparatus predicts the MB generated code amounts of image parts of the image data and the MB generated code amounts of header parts of the image data separately.

Consequently, the coding apparatus can improve the accuracy of prediction of the MB generated code amounts since it can predict the MB generated code amounts of the image parts and header parts having different increasing/decreasing tendencies separately.

Moreover, the coding apparatus uses the MB generated code amount of a header part at the fixed quantization parameter QPI as the MB generated code amount of the header part at quantization parameters QP other than the fixed quantization parameter QPI, on which unselected quantizer steps are based, if the quantization parameters QP other than the fixed quantization parameter QPI fall within a first step range of "0 to 26" which is close to the fixed quantization parameter QPI, on which the selected quantizer step is based.

The coding apparatus also uses a fixed MB generated code amount having a predetermined fixed value of "A" as the MB generated code amount of a header part at quantization parameters QP other than the fixed quantization parameter QPI, on which unselected quantizer steps are based, if the quantization parameters QP other than the fixed quantization parameter QPI fall within a second step range of "40" and above which is far from the fixed quantization parameter QPI, on which the selected quantizer step is based.

Furthermore, the coding apparatus uses a value that is calculated by linear interpolation between the MB generated code amount at the fixed quantization parameter QPI, on which the selected quantizer step is based, and a fixed MB generated code amount (where the quantization parameters QPI are set to the maximum value "26" Of the first step range and the minimum value "40" of the second step range) as the MB generated code amounts at quantization parameters QP other than the fixed quantization parameter QPI, on which unselected quantizer steps are based, if the quantization parameters QP other than the fixed quantization parameter QPI fall within a third step range of "27 to 39" which lies between "0 to 26" and "40" and above.

Consequently, the coding apparatus can improve the accuracy of prediction of the MB generated code amounts since it can predict the MB generated code amounts according to the characteristics of the header parts.

The coding apparatus generates an actual coded stream as actual quantization data by quantizing image data, followed by arithmetic coding. The coding apparatus generates a temporary coded stream as temporary quantized data by quantizing the image data, followed by variable length coding where contexts are switched adaptively.

The coding apparatus can therefore be simplified in configuration since it can predict the MB generated code amounts of respective pieces of image data by using variable length coding which is simpler than arithmetic coding. The use of variable length coding where contexts are switched adaptively can also reduce errors that can occur with respect to arithmetic coding.

According to the foregoing configuration, the coding apparatus corrects the MB generated code amounts shown by quantization parameters QP other than the fixed quantization parameter QPI in the prediction tables depending on the coding schemes. The coding apparatus can thus predict the MB generated code amounts resulting from the quantization parameters other than the fixed quantization parameter QPI based on the MB generated code amounts based on the fixed quantization parameter QP.

(5) Other Embodiments

Now, the foregoing first embodiment has dealt with the case where the fixed quantizer scale QI is set to "10." The present invention is not limited thereto, however, and any one of the quantization indexes of 1 to 31 may be selected. The same holds for the fixed quantization parameter QPI in the fourth embodiment, and any one of quantization indexes of 0 to 51 may be selected.

Moreover, the foregoing first to fourth embodiments have dealt with the cases where the quantization units are macroblocks consisting of 16×16 pixels. The present invention is not limited thereto, however. For example, sub-macroblocks of 8×8 pixels or 4×4 pixels may be used as the quantization units. There is no particular limitation on the number of pixels to make a quantization unit.

The foregoing first to fourth embodiments have also dealt with the cases where the coding units are pictures. The present, invention is not limited thereto, however. For example, a coding unit may be a GOP including a predetermined number of pictures, a slice including a plurality of macroblocks, a frame consisting of two pictures, and so on without any particular limitation.

Furthermore, the foregoing first to third embodiments have dealt with the cases where the coding is performed in conformity with MPEG-2. The present invention is not limited thereto, however. The same holds for the fourth embodiment, which is not limited to the AVC standard. There is no particular limitation on the coding schemes. In short, the present invention can be applied to any coding apparatus in which quantization is performed with a plurality of predetermined quantizer steps.

The foregoing first to fourth embodiments have also dealt with the cases where the relationship between the quantizer scales Q or quantization parameters QP and the MB generated code amounts is statistically collected from a plurality of pieces of quantized data for prediction having certain MB generated code amounts, and is stored as relationship information. The present invention is not limited thereto, however. For example, the relationship may be collected in a discrete fashion between the quantizer scales Q or quantization parameters QP and the MB generated code amounts of a plurality of pieces of quantized data for prediction. Using conversion formulas or the like based on these, the MB generated code amounts of the quantized data for prediction may be predicted in an approximate fashion by linear interpolation or the like, and stored as the relationship information. This relationship information need not necessarily be generated on a picture type by picture type basis. The number of pieces of prediction quantized data (i.e., groups) to be set in the relationship information may also be determined arbitrarily.

The foregoing first to fourth embodiments have also dealt with the cases where adaptive quantization is performed in the parameter encoding (actual coding). The present invention is not limited thereto, however, and does not necessarily require adaptive quantization. In this case, the pre-encoding (temporary coding) does not require adaptive quantization (activity-based increasing/decreasing of quantizer steps), either. Activities need not necessarily be used as an index for adaptive quantization, either. Other indexes may be used for adaptive quantization.

The foregoing first to fourth embodiments have also dealt with the cases where MB generated code amounts resulting from other quantizer steps are predicted, and are reflected on the target generated code amounts $Target_{MB}$ by rate control. The present invention is not limited thereto, however. For example, the MB generated code amounts predicted may be used for the processing of determining whether or not the coded stream can be accommodated within the storage capacity of a recording medium, and for the processing of determining a compression rate.

The foregoing first to fourth embodiments have also dealt with the cases where the picture generated code amount is brought close to the picture target code amount by means of quantization on modified quantizer scales $QS_{MB}$, which are modified out of basic quantizer scales Q, or with modified quantizer steps based on modified quantization parameters $QPS_{MB}$, which are modified out of basic quantizer steps based on basic quantization parameters QP. The present invention is not limited thereto, but may simply use basic quantizer scales Q or basic quantization parameters QP for quantization.

The foregoing first to fourth embodiments have also dealt with the cases where the average quantizer scale Qa is a quantizer scale Q or quantization parameter QP at which the picture generated code amount is smaller than and the closest to the picture target code amount pictBit. The present invention is not limited thereto, however. For example, a quantizer scale Q may be selected at which the picture generated code amount is the closest to the picture target code amount pictBit. The same holds for the quantization parameters QP.

Moreover, the foregoing fourth embodiment has dealt with the case where Coef Costs are used as an index value for determining the variable correction value CorrectBits. The present invention is not limited thereto, however, and the variable correction value CorrectBits may be determined by various other methods. Coef Costs may be used in a separate form, instead of a total sum. Coef Costs may be compared to each other, not in terms of per coefficient. The method of calculating Coef Costs is not limited in particular. Values simply proportional to DCT coefficients may be used as Coef Costs.

The fourth embodiment has also dealt with the case of adding the fixed correction value CostDiff. The present invention is not limited thereto, however. The correction with the fixed correction value CostDiff is not necessarily required.

The foregoing fourth embodiment has also dealt with the case where the MB generated code amounts of the image parts and header parts are predicted separately. The present invention is not limited thereto, however, and the MB generated code amounts of those parts may be predicted at the same time. The method of predicting the MB generated code amounts of the header parts is not limited, either. For example, relationship information dedicated to the header parts may be used as with the image parts.

The foregoing fourth embodiment has also dealt with the case where the actual coding processing is performed by arithmetic coding while the temporary coding processing is performed by variable length coding. The present invention is not limited thereto. There is no particular limitations on the coding schemes. An identical coding scheme may be used for coding. Other coding methods may also be used.

While the embodiments of the present invention have been described above, it will be understood that the present invention is not limited thereto, and various improvements and modifications may be made without departing from the spirit of the present invention. The configurations of the foregoing first to fourth embodiments may also be combined as appropriate.

For example, it will be appreciated that the image processing apparatuses and methods according to the first to fourth embodiments described above may also be practiced as a program to be executed by a computer, and a recording medium containing the program, even in which cases the aforementioned operations and effects are provided.

The invention claimed is:
1. An image processing apparatus comprising:
 a quantization selection section for selecting a quantizer step for each quantization unit from among a plurality of quantizer steps;
 a temporary coding section for quantizing image data with the quantizer step selected by the quantization selection section to generate temporary quantized data, and calculating a quantization unit generated code amount, the quantization unit generated code amount being a generated code amount of each quantization unit of the temporary quantized data;
 a storing section for storing relationship information on a plurality of pieces of quantized data for prediction having different quantization unit generated code amounts at the quantizer step selected by the quantization selection section, the relationship information indicating a relationship between the plurality of quantizer steps and the quantization unit generated code amounts;
 a data selection section for selecting quantized data for prediction from the relationship information based on the quantization unit generated code amount of the temporary quantized data and the quantizer step selected by the quantization selection section; and a code amount prediction section for predicting the quantization unit generated code amounts for situations where the image data is quantized with quantizer steps not selected by the quantization selection section out of the plurality of quantizer steps, based on the quantized data for prediction selected by the data selection section.

2. The image processing apparatus according to claim 1, comprising
a coding unit generated code amount prediction section for predicting a coding unit generated code amount by adding up the quantization unit generated code amounts predicted, the coding unit generated code amount being a generated code amount of each coding unit of the quantized data.

3. The image processing apparatus according to claim 2, comprising
a basic quantizer step prediction section for predicting a basic quantizer step out of the plurality of quantizer steps so that the coding unit generated code amount approaches a coding unit target code amount, the coding unit target code amount being a target code amount of the each coding unit.

4. The image processing apparatus according to claim 3, comprising:
an actual coding section for quantizing the image data in units of the each quantization unit, thereby generating actual quantized data; and
a code amount control section for controlling the actual coding section so as to quantize the image data with a modified quantizer step so that the coding unit generated code amount of the actual quantized data approaches the coding unit target code amount, the modified quantizer step being the basic quantizer step modified.

5. The image processing apparatus according to claim 4, comprising
a modified quantizer step determination section for determining the modified quantizer step based on a difference in the amount of code between the quantization unit generated code amount of the actual quantized data and a quantization unit target code amount, the quantization unit target code amount being a target generated code amount of the each quantization unit.

6. The image processing apparatus according to claim 4, comprising
a quantization unit target code amount setting section for setting the quantization unit generated code amount predicted based on the basic quantizer step predicted by the basic quantizer step prediction section as the quantization unit target code amount.

7. The image processing apparatus according to claim 4, wherein
the code amount control section includes a quantization unit target code amount setting section for setting, as the quantization unit target code amount, a value determined by multiplying the quantization unit generated code amount based on the quantizer step selected by the quantization selection section by the ratio of the coding unit target code amount to the coding unit generated code amount at the quantizer step selected by the quantization selection section.

8. The image processing apparatus according to claim 1, wherein
the basic quantizer step prediction section predicts the basic quantizer step by selecting an average quantizer step that makes the coding unit generated code amount smaller than the coding unit target code amount and minimizes a difference between the coding unit generated code amount and the coding unit target code amount, and increasing/decreasing an activity adjusting value with respect to the average quantizer step.

9. The image processing apparatus according to claim 1, wherein
the temporary coding section quantizes the image data of the coding unit with the quantizer step selected by the quantization selection section.

10. The image processing apparatus according to claim wherein:
the storing section stores the relationship information on a picture type by picture type basis; and
the code amount prediction section selects the quantized data for prediction from the relationship information according to the picture type.

11. The image processing apparatus according to claim 1, wherein
the temporary coding section quantizes the image data with a quantizer step according to the image data of the each quantization unit.

12. The image processing apparatus according to claim 1, wherein:
the temporary coding section generates the temporary quantized data by quantizing the image data, followed by variable length coding using a fixed table; and
the code amount prediction section predicts the quantization unit generated code amount of the quantized data for prediction selected by the data selection section at a quantizer step not selected by the quantization selection section as the quantization unit generated code amount for situations where the image data is quantized with the quantizer step not selected by the quantization selection section.

13. The image processing apparatus according to claim 1, wherein:
the temporary coding section generates the temporary quantized data by quantizing the image data, followed by coding with a coding method where the quantization unit generated code amount does not vary largely depending on areas; and
the code amount prediction section corrects the quantization unit generated code amount of the quantized data for prediction selected by the data selection section at a quantizer step not selected by the quantization selection section, thereby predicting the generated code amount for situations where the image data is quantized with the quantizer step not selected by the quantization selection section.

14. The image processing apparatus according to claim 13, wherein:
the temporary coding section generates the image data by applying predetermined orthogonal transform processing to image data; and
the code amount prediction section determines a correction value for correcting the quantization unit generated code amount of the quantized data for prediction selected by the data selection section at the quantizer step not selected by the quantization selection section based on a transform coefficient of the image data.

15. The image processing apparatus according to claim 14, wherein
the code amount prediction section calculates an index total of index values in the each quantization unit and determines correction values for correcting the quantization unit generated code amount based on the index total, the index values being calculated according to a zero quantizer step necessary to make the transform coefficient zero.

16. The image processing apparatus according to claim 1, wherein
the code amount prediction section adds a difference of the quantization unit generated code amount from the generated code amount of the quantized data for prediction at the quantizer step selected by the quantization selection section to the quantization unit generated code amount of the quantized data for prediction at a quantizer step not selected by the quantization selection section, thereby predicting the quantization unit generated code amount at the quantizer step not selected by the quantization selection step.

17. The image processing apparatus according to claim 1, wherein
the code amount prediction section includes:
an image code amount prediction section for predicting the quantization unit generated code amount of an image part of the image data; and
a header code amount prediction section for predicting the quantization unit generated code amount of a header part of the image data.

18. The image processing apparatus according to claim 13, wherein:
the temporary coding section generates the quantized data in conformity with the AVC standard;
the code amount prediction section includes
an image code amount prediction section for predicting the quantization unit generated code amount of an image part of the image data; and
a header code amount prediction section for predicting the quantization unit generated code amount of a header part of the image data; and
the header code amount prediction section includes
a first header code amount prediction section for using the quantization unit generated code amount at the quantizer step selected by the quantization selection section as the quantization unit generated code amount at the quantizer step not selected by the quantization selection section when the quantizer step not selected by the quantization selection section is based on a quantization parameter of not higher than 26 among quantization parameters of 0 to 51 for quantizer steps to be based on;
a second header code amount prediction section for using a fixed generated code amount having a predetermined fixed value as the quantization unit generated code amount at the quantizer step not selected by the quantization selection section when the quantizer step not selected by the quantization selection section is based on the quantization parameters of not lower than 40 and not higher than 51; and
a third header code amount prediction section for using a value calculated by linear interpolation between the quantization unit generated code amount at the quantizer step selected by the quantization selection section and the fixed generated code amount (where the quantizer steps are a maximum value of a first step range and a minimum value of a second step range, respectively) as the quantization unit generated code amount at the quantizer step not selected by the quantization selection section when the quantizer step not selected by the quantization selection section is based on the quantization parameters of not lower than 27 and not higher than 39.

19. The image processing apparatus according to claim 4, wherein
the actual coding section generates the actual quantized data by quantizing the image data, followed by coding by arithmetic coding; and
the temporary coding section generates the temporary quantized data by quantizing the image data, followed by coding by variable length coding where contexts are switched adaptively.

20. An image processing method comprising:
a quantization selection step of selecting a quantizer step for each quantization unit from among a plurality of quantizer steps;
a temporary coding step of quantizing image data with the quantizer step selected by the quantization selection step to generate temporary quantized data, and calculating a quantization unit generated code amount, the quantization unit generated code amount being a generated code amount of each quantization unit of the temporary quantized data;
a storing step of storing relationship information on a plurality of pieces of quantized data for prediction having different quantization unit generated code amounts at the quantizer step selected by the quantization selection step, the relationship information indicating a relationship between the plurality of quantizer steps and the quantization unit generated code amounts;
a data selection step of selecting quantized data for prediction from the relationship information based on the quantization unit generated code amount of the temporary quantized data and the quantizer step selected by the quantization selection step; and
a code amount prediction step of predicting the quantization unit generated code amounts for situations where the image data is quantized with quantizer steps not selected by the quantization selection section out of the plurality of quantizer steps, based on the quantized data for prediction selected by the quantization selection step.

* * * * *

UNITED STATES PATENT AND TRADEMARK OFFICE
CERTIFICATE OF CORRECTION

| | | |
|---|---|---|
| PATENT NO. | : 8,238,423 B2 | Page 1 of 1 |
| APPLICATION NO. | : 12/530643 | |
| DATED | : August 7, 2012 | |
| INVENTOR(S) | : Shojiro Shibata et al. | |

It is certified that error appears in the above-identified patent and that said Letters Patent is hereby corrected as shown below:

Claims:

Col. 40, Line 9-16, should read as follows:

--10. The image processing apparatus according to claim 1, wherein:
    the storing section stores the relationship information on a picture type by picture type basis; and
    the code amount prediction section selects the quantized data for prediction from the relationship information according to the picture type.--

Signed and Sealed this
Second Day of October, 2012

David J. Kappos
*Director of the United States Patent and Trademark Office*